(12) United States Patent
Koyama et al.

(10) Patent No.: US 7,010,908 B2
(45) Date of Patent: Mar. 14, 2006

(54) ANOMALY JUDGMENT APPARATUS FOR SECONDARY AIR SUPPLY SYSTEM

(75) Inventors: Hiroyasu Koyama, Susono (JP); Shigemasa Hirooka, Susono (JP); Takeo Ogiso, Toyota (JP); Kenji Kimura, Okazaki (JP); Keita Nakanishi, Iwata (JP)

(73) Assignees: Toyota Jidosha Kabushiki Kaisha, Toyota (JP); Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/819,236

(22) Filed: Apr. 7, 2004

(65) Prior Publication Data

US 2004/0211170 A1 Oct. 28, 2004

(30) Foreign Application Priority Data

Apr. 24, 2003 (JP) .............................. 2003-119752

(51) Int. Cl.
*F01N 3/00* (2006.01)
(52) U.S. Cl. ........................... 60/277; 60/289; 60/290; 60/324
(58) Field of Classification Search .................. 60/274, 60/276, 277, 289, 324, 290
See application file for complete search history.

(56) References Cited

U.S. PATENT DOCUMENTS

| | | | | | |
|---|---|---|---|---|---|
| 5,400,591 | A | * | 3/1995 | Aramaki | 60/274 |
| 5,560,199 | A | * | 10/1996 | Agustin et al. | 60/274 |
| 5,706,653 | A | * | 1/1998 | Shoji et al. | 60/276 |
| 5,782,086 | A | * | 7/1998 | Kato et al. | 60/274 |
| 5,852,929 | A | * | 12/1998 | Kato et al. | 60/274 |
| 6,393,833 | B1 | * | 5/2002 | Mizoguchi | 60/289 |
| 2003/0061805 | A1 | * | 4/2003 | Hirooka et al. | 60/289 |

FOREIGN PATENT DOCUMENTS

| | | |
|---|---|---|
| EP | 1 293 648 A2 | 3/2003 |
| JP | A 9-21312 | 1/1997 |
| JP | A 9-21313 | 1/1997 |
| JP | A 2003-83048 | 3/2003 |

* cited by examiner

Primary Examiner—Tu M. Nguyen
(74) Attorney, Agent, or Firm—Oliff & Berridge, PLC

(57) ABSTRACT

An anomaly judgment apparatus for a secondary air supply system which includes a secondary air supply path for introducing secondary air into an exhaust path of an internal combustion engine and an open-close valve disposed in the secondary air supply path. The valve is opened and/or closed by drive force of negative pressure introduced from a portion of an intake path of the engine downstream of a throttle valve. The anomaly judgment apparatus includes an anomaly judgment section for judging whether or not the secondary air supply system is anomalous; a negative pressure judgment section for judging whether or not the negative pressure is secured to a degree required for the drive force to reliably open and/or close the open-close valve; and an anomaly judgment prohibition section for prohibiting judgment by the anomaly judgment section when the negative pressure is not secured to the required degree.

7 Claims, 10 Drawing Sheets

ANOMALY JUDGMENT APPARATUS FOR SECONDARY AIR SUPPLY SYSTEM

BACKGROUND OF THE INVENTION

1. Field of the Invention

The present invention relates to an anomaly judgment apparatus for a secondary air supply system, which is adapted to supply secondary air to a portion of an exhaust path of an internal combustion engine located upstream of a catalytic converter disposed in the exhaust path.

2. Description of the Related Art

Conventionally, in order to eliminate harmful components (CO, HC, and $NO_x$) from exhaust gas emitted from an internal combustion engine, a three-way catalytic converter (herein may be referred to merely as a "catalytic converter") is disposed in an exhaust path of the internal combustion engine. When the temperature of the three-way catalytic converter is lower than an activation temperature needed for the three-way catalytic converter to exhibit its catalytic function, the three-way catalytic converter fails to sufficiently exhibit its exhaust purification function. Therefore, when the temperature of the three-way catalytic converter is lower than the activation temperature; for example, in the case where an internal combustion engine is started when the temperature of the internal combustion engine is near ambient temperature (outside air temperature) (hereinafter referred to as "at the time of cold start"), the temperature of the three-way catalytic converter must be increased as soon as possible so as to activate (warm up) the three-way catalytic converter.

In order to fulfill the above need, a secondary air supply system is widely used. The secondary air supply system supplies secondary air to a portion of the exhaust path located upstream of the three-way catalytic converter, whereby the three-way catalytic converter is actively warmed up by heat of reaction that is generated when oxygen contained in the secondary air oxidizes unburnt components (particularly HC) contained in exhaust gas.

Component parts of such a secondary air supply system generally include an air pump and an air switching valve. The air pump is adapted to introduce air into a secondary air supply path connected to a portion of the exhaust path located upstream of the three-way catalytic converter. The air switching valve is provided in a portion of the secondary air supply path located downstream of the air pump and adapted to control opening and closing of the secondary air supply path. When anomaly arises in such a component part of the secondary air supply system, the following problem arises. Even when an instruction to supply secondary air is issued to the secondary air supply system, secondary air is not supplied, and thus warming up of the three-way catalytic converter is delayed, resulting in an increase in the quantity of emissions. Alternatively, even when an instruction to stop supplying secondary air is issued to the secondary air supply system, secondary air continues being supplied, and thus the air-fuel ratio of exhaust gas shifts to the lean side, resulting in a drop in $NO_x$ elimination efficiency. Therefore, when anomaly arises in the secondary air supply system (component parts of the same), the occurrence of the anomaly must be detected.

In view of the above, a secondary air supply system (anomaly judgment apparatus for the same) disclosed in Japanese Patent Application Laid-Open (kokai) No. 9-21312 is configured as follows. A pressure sensor is provided to detect pressure in a portion of a secondary air supply path that extends between an air pump and an air switching valve, which are component parts of the secondary air supply system. Whether or not any of the component parts is anomalous is judged on the basis of the results of judgment as to whether the pressure detected by the pressure sensor falls within a predetermined normal range.

In the above-disclosed secondary air supply system, a so-called "normally-closed negative-pressure-responsive-type open-close valve" is used as the air switching valve. The negative-pressure-responsive-type open-close valve utilizes, as negative pressure, the pressure in a portion of an intake path downstream of a throttle valve (hereinafter referred to as "throttle valve downstream pressure"), and is opened by drive force produced by the negative pressure. Accordingly, the secondary air supply system is configured such that when the secondary air supply system is instructed to supply secondary air, the system introduces the throttle valve downstream pressure (according, negative pressure) to the air switching valve, to thereby open the air switching valve. Accordingly, in order to reliably open the air switching valve upon receipt of an issued instruction for secondary air supply, a sufficient degree of negative pressure must be secured (i.e., the throttle valve downstream pressure must be a sufficiently low, stable pressure) at the time when the instruction is issued.

Incidentally, the throttle valve downstream pressure changes depending on operating conditions of the engine. Further, a surge tank is generally disposed in the intake path to be located downstream of the throttle valve in order to increase the volume of the intake path for the purpose of, for example, attenuating intake air pulsation of the engine. Therefore, the throttle valve downstream pressure has characteristics such that once the pressure becomes high, the pressure does not immediately decrease to a sufficiently low pressure.

As can be understood from the above, if the throttle valve downstream pressure is so high that the above-described sufficient level of negative pressure cannot be secured at the time of issuance of an instruction for secondary air supply, there may continue a state in which although the air switching valve is normal, the air switching valve is not reliably opened over a certain period of time after issuance of the instruction. Therefore, if judgment as to whether or not the secondary air supply system (component parts of the same) is anomalous is performed by use of the above disclosed anomaly judgment apparatus in the above-described state, the pressure detected by the pressure sensor falls outside the predetermined normal range, whereby the secondary air supply system (the air switching valve, in this example), may be erroneously judged to be anomalous, even if the secondary air supply system is normal.

SUMMARY OF THE INVENTION

An object of the present invention is to provide an anomaly judgment apparatus for a secondary air supply system including, in its secondary air supply path, an open-close valve which utilizes, as negative pressure, pressure in a portion of an intake path downstream of a throttle valve, and is driven by the negative pressure, the anomaly judgment apparatus being capable of correctly judging whether or not the secondary air supply system is anomalous.

To achieve the above object, the present invention provides an anomaly judgment apparatus for a secondary air supply system which includes a secondary air supply path for introducing secondary air into a portion of an exhaust path of an internal combustion engine located upstream of a catalytic converter disposed in the exhaust path, and an open-close valve which utilizes, as negative pressure, pressure in a portion of an intake path of the engine downstream of a throttle valve disposed in the intake path, the open-close valve being opened and/or closed by means of drive force produced by the negative pressure so as to open and close the secondary air supply path. The anomaly judgment apparatus comprises anomaly judgment means for judging whether or not the secondary air supply system is anomalous; negative pressure judgment means for judging whether or not the negative pressure is secured to a degree required for the drive force to reliably open and/or close the open-close valve; and anomaly judgment prohibition means for prohibiting judgment by the anomaly judgment means when the negative pressure judgment means judges that the negative pressure is not secured to the required degree.

Preferably, the secondary air supply system to which the anomaly judgment apparatus according to the present invention is applied includes an air pump which is provided in a portion of the secondary air supply path upstream of the open-close valve and adapted to introduce (transfer under pressure) air into the secondary air supply path. Alternatively, the secondary air supply system includes the above-described air pump, and a pressure sensor for detecting pressure within a portion of the secondary air supply path between the air pump and the open-close valve.

Examples of the open-close valve include, but are not limited to, a so-called normally-closed negative-pressure-responsive-type open-close valve which is opened (changed from a closed state to an open state) by drive force produced by negative pressure, and a so-called normally-opened negative-pressure-responsive-type open-close valve which is closed (changed from an open state to a closed state) by drive force produced by negative pressure.

The anomaly judgment means judges whether or not the secondary air supply system is anomalous, on the basis of, for example, pressure detected by the pressure sensor, the pressure and a pulsation level representing a degree of pulsation of the pressure, a value in relation to energy consumed by drive of the air pump (e.g., current supplied to an electric motor for driving the air pump), or an air-fuel ratio of exhaust gas (e.g., an output of an air-fuel ratio sensor disposed in the exhaust path to be located between a location to which secondary air is supplied and a catalytic converter). However, the present invention is not limited by these examples. The above-mentioned pulsation level is, for example, an integrated pulsation value (area) that is obtained by integrating the absolute value of the deviation between the detected pressure and a dulled pressure that follows the detected pressure in a predetermined relation. However, the present invention is not limited to this example.

In this case, preferably, the negative pressure judgment means includes acquisition means for acquiring a value corresponding to the drive force, and is configured such that, when a state in which the value corresponding to the drive force is greater than a predetermined value does not continue for a predetermined period of time, the negative pressure judgment means judges that the negative pressure is not secured to the required degree. Examples of the value corresponding to the drive force include, but are not limited to, the throttle valve downstream pressure itself, and differential pressure between atmospheric pressure and throttle valve downstream pressure.

The anomaly judgment apparatus for a secondary air supply system according to the present invention does not perform judgment as to whether or not the secondary air supply system is anomalous when the negative pressure is not secured to a degree required for the drive force produced by the negative pressure to reliably open and/or close the open-close valve. Specifically, such judgement is not performed, for example, when a state in which the value corresponding to the drive force (for example, differential pressure between atmospheric pressure and throttle valve downstream pressure) is greater than a predetermined value does not continue for a predetermined period of time. Accordingly, when the above-described judgment is performed, a sufficient negative pressure required to reliably drive the open-close valve is guaranteed to be secured. Thus, erroneous judgment, which would otherwise occur because of insufficient negative pressure, can be prevented.

In this case, preferably, the anomaly judgment means is configured to perform (start) the judgment as to whether or not the secondary air supply system is anomalous, when the negative pressure is secured to a degree required for the drive force produced by the negative pressure to reliably open and/or close the open-close valve (e.g., when a state in which the value corresponding to the drive force (for example, differential pressure between atmospheric pressure and throttle valve downstream pressure) is greater than a predetermined value has continued for a predetermined period of time).

In the anomaly judgment apparatus for a secondary air supply system which includes the above-mentioned acquisition means, preferably, the acquisition means includes an atmospheric pressure sensor for detecting an atmospheric pressure, and a throttle-valve-downstream-pressure acquisition means for acquiring pressure in a portion of the intake path downstream of the throttle valve; and the acquisition means acquires, as the value corresponding to the drive force, a differential pressure between the detected atmospheric pressure and the acquired pressure in the intake path. The throttle-valve-downstream-pressure acquisition means may be a pressure sensor disposed in a portion of the intake path downstream of the throttle valve and adapted to physically measure the throttle valve downstream pressure, a table for estimating the throttle valve downstream pressure on the basis of various parameters representing operating conditions of the engine (e.g., throttle valve opening, engine speed, and intake air flow rate), or any other suitable means.

The atmospheric pressure (outside pressure) changes in accordance with the traveling location of the vehicle. Accordingly, the drive force produced by the negative force so as to drive the open-close valve varies in accordance with the atmospheric pressure even when the throttle valve downstream pressure is constant. Therefore, when, with the atmospheric pressure being assumed constant, the "differential pressure between the atmospheric pressure and the throttle valve downstream pressure" (the value corresponding to the drive force) is obtained on the basis of the throttle valve downstream pressure only, the differential pressure may differ from an accurate value (actual value).

In contrast, when the above-described configuration is employed to thereby acquire, as the value corresponding to the drive force, a differential pressure between the detected atmospheric pressure and the acquired throttle valve downstream pressure, the value of the atmospheric pressure to be used for obtaining the "differential pressure between the atmospheric pressure and the throttle valve downstream pressure" can be updated at each predetermined timing on the basis of the output value of the atmospheric pressure sensor, whereby the differential pressure can be obtained more accurately. Accordingly, determination as to whether the judgment by the anomaly judgment means is to be prohibited can be performed accurately, and thus erroneous judgment, which would otherwise occur because of insufficient negative pressure, can be prevented more reliably.

Generally, since the atmospheric pressure sensor is disposed in the intake path to be located between the air filter and the throttle valve, during operation of the engine, the atmospheric pressure sensor detects a pressure which is lower than the atmospheric pressure by a pressure loss of the air filter. Accordingly, the value of the atmospheric pressure to be used for obtaining the "differential pressure between the atmospheric pressure and the throttle valve downstream pressure" is preferably updated on the basis of the output value of the atmospheric pressure sensor every time the engine is started (e.g., when the position of the ignition switch is changed from "OFF" to "ON"). Further, before startup of the engine, the "pressure sensor for physically measuring the throttle valve downstream pressure" outputs a value corresponding to the atmospheric pressure. Accordingly, in the case where the value of the atmospheric pressure is updated before each startup of the engine, the "pressure sensor for physically measuring the throttle valve downstream pressure" may be used as the atmospheric pressure sensor.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
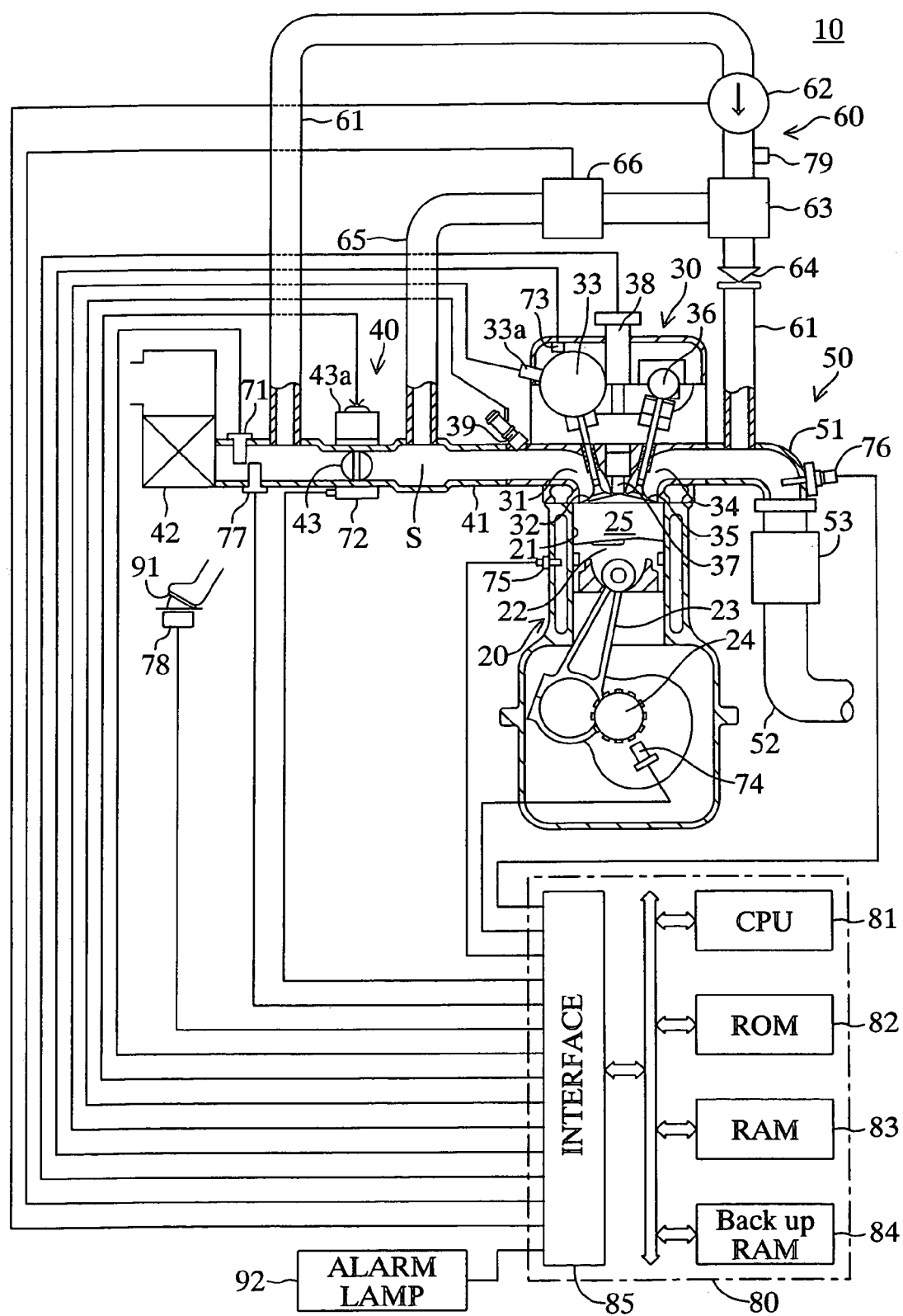
FIG. 1 is a schematic view of an internal combustion engine to which anomaly judgment apparatus for a secondary air supply system according to the present invention is applied.

An embodiment of an anomaly judgment apparatus for a secondary air supply system according to the present invention will be described in detail with reference to the drawings. FIG. 1 shows a schematic system configuration of the anomaly judgment apparatus applied to a spark-ignition-type multi-cylinder (4-cylinder) internal combustion engine 10 equipped with a secondary air supply system. FIG. 1 shows a configuration related to only a certain single cylinder among multiple cylinders. A configuration related to each of other cylinders is similar to that of FIG. 1.

The internal combustion engine 10 includes a cylinder block section 20 including a cylinder block, a cylinder block lower-case, and an oil pan; a cylinder head section 30 fixed on the cylinder block section 20; an intake system 40 for supplying a gasoline-air mixture to the cylinder block section 20; an exhaust system 50 for emitting exhaust gas from the cylinder block section 20 to the exterior of the engine 10; and a secondary air supply system 60 for performing secondary air supply control to supply secondary air to the exhaust system 50.

The cylinder block section 20 includes cylinders 21, pistons 22, connecting rods 23, and a crankshaft 24. Each of the pistons 22 reciprocates within the corresponding cylinder 21. The reciprocating motion of the piston 22 is transmitted to the crankshaft 24 via the corresponding connecting rod 23, whereby the crankshaft 24 rotates. The cylinder 21 and the head of the piston 22, together with the cylinder head section 30, form a combustion chamber 25.

The cylinder head section 30 includes an intake port 31 communicating with the combustion chamber 25; an intake valve 32 for opening and closing the intake port 31; a variable intake timing unit 33 including an intake cam shaft for driving the intake valve 32 and adapted to continuously change the phase angle of the intake cam shaft; an actuator 33a for the variable intake timing unit 33; an exhaust port 34 communicating with the combustion chamber 25; an exhaust valve 35 for opening and closing the exhaust port 34; an exhaust cam shaft 36 for driving the exhaust valve 35; a spark plug 37; an igniter 38 including an ignition coil for generating a high voltage to be applied to the spark plug 37; and an injector (fuel injection means) 39 for injecting fuel into the intake port 31.

The intake system 40 includes an intake pipe 41 communicating with the intake port 31, forming an intake path together with the intake port 31, and including an intake manifold, a portion of the intake pipe 41 functioning as a surge tank S; an air filter 42 provided at an end portion of the intake pipe 41; a throttle valve 43 provided in the intake pipe 41 and adapted to vary the cross-sectional opening area of the intake path; and a throttle valve actuator 43a, which includes a DC motor and serves as throttle valve drive means.

The exhaust system 50 includes an exhaust manifold 51 communicating with the exhaust port 34; an exhaust pipe 52 connected to the exhaust manifold 51; and a catalytic converter (also called a "3-way catalytic converter" or "start catalytic converter") 53 disposed in the exhaust pipe 52. The exhaust port 34, the exhaust manifold 51, and the exhaust pipe 52 constitute an exhaust path.

The secondary air supply system 60 includes a secondary air supply path 61 for establishing communication between a portion of the intake path located downstream of the air filter 42 and upstream of the throttle valve 43 and a portion of the exhaust path (in actuality, a portion of the exhaust path of each cylinder) located upstream of the catalytic converter 53; an air pump 62 provided in the secondary air supply path 61 and adapted to forcibly transfer air under pressure from the intake path to the exhaust path; an air switching valve (hereinafter referred to as an "ASV") 63 serving as an open/close valve, disposed in a portion of the secondary air supply path 61 downstream of the air pump 62, and adapted to open and close the secondary air supply path 61; and a reed valve 64 provided in a portion of the secondary air supply path 61 located downstream of the ASV 63 and adapted to permit air flow in the secondary air supply path 61 only in the direction toward the exhaust path. The secondary air supply system 60 further includes a negative-pressure introduction path 65 for introducing negative pressure (i.e., throttle valve downstream pressure Pm) into the ASV 63 from the surge tank S; and a normally closed solenoid on-off valve (hereinafter referred to as the "solenoid valve") 66 provided in the negative-pressure introduction path 65 and adapted to open and close the negative-pressure introduction path 65.

The ASV 63 is a normally-closed negative-pressure-responsive-type open-close valve. An illustrated valve element of the ASV 63 is urged in the close direction by means of urging force of an unillustrated spring, and is urged in the open direction by means of drive force (drive force produced by negative force) corresponding to the differential pressure (hereinafter referred to as "ASV drive pressure Pdv") between the atmospheric pressure (outside pressure) Pa and the throttle valve downstream pressure Pm serving as negative pressure. Accordingly, the ASV 63 is opened when a sufficiently low throttle valve downstream pressure Pm (accordingly, a sufficiently high ASV drive pressure Pdv) required to overcome the urging force of the spring toward the close direction is supplied to the ASV 63, and is closed when such low throttle valve downstream pressure Pm is not supplied to the ASV 63. In other words, the ASV 63 is in the open state when the solenoid valve 66 is in the excited state (in the open state), and is in the closed state when the solenoid valve 66 is in the unexcited state (in the closed state). Under the above-described configuration, when the secondary air supply control (hereinafter may be called "AI") is to be performed, the secondary air supply system 60 activates the air pump 62 and brings the solenoid valve 66 to the open state; and when the secondary air supply control is to be stopped, the secondary air supply system 60 deactivates the air pump 62 and brings the solenoid valve 66 to the closed state.

Meanwhile, the present system includes a hot-wire air flowmeter 71; a throttle position sensor 72; a cam position sensor 73; a crank position sensor 74; a water temperature sensor 75; an air-fuel ratio sensor 76 disposed in a portion of the exhaust path located upstream of the catalytic converter 53; an atmospheric pressure sensor 77 disposed in a portion of the intake path located between the air filter 42 and the throttle valve 43; an accelerator opening sensor 78; and a pressure sensor 79, which serves as the pressure detection means, disposed in a portion of the secondary air supply path 61 located downstream of the air pump 62 and upstream of the ASV 63.

Figure 2:
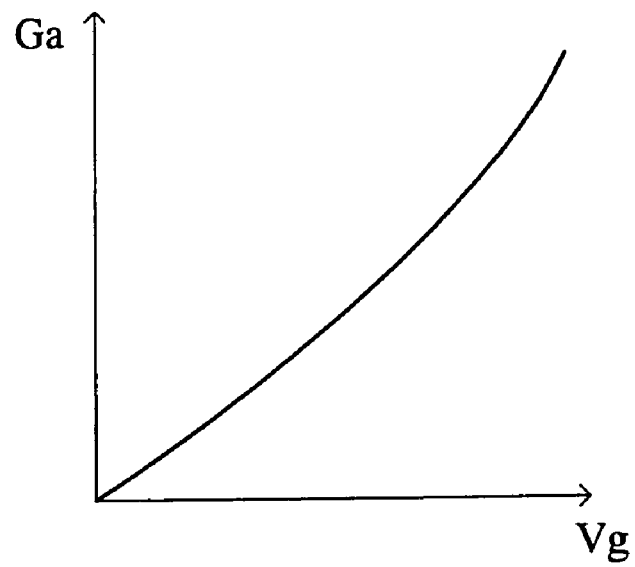
FIG. 2 is a map showing the relationship between the output voltage of the air flowmeter shown in FIG. 1 and a measured intake air flow rate.

The hot-wire air flowmeter 71 outputs voltage Vg in accordance with the mass flow rate of intake air flowing through the intake pipe 41. FIG. 2 shows the relationship between the output Vg of the air flowmeter 71 and the measured intake air flow rate Ga. The throttle position sensor 72, which serves as the throttle valve opening detection means, detects the opening of the throttle valve 43 and outputs a signal indicative of the throttle valve opening TA. The cam position sensor 73 generates a signal that assumes the form of a single pulse (G2 signal), every time the intake cam shaft rotates by 90° (i.e., every time the crankshaft 24 rotates by 180°). The crank position sensor 74, which serves as the rotational-speed detection means, outputs a signal that assumes the form of a narrow pulse every 10° rotation of the crankshaft 24 and assumes the form of a wide pulse every 360° rotation of the crankshaft 24. This signal indicates the engine speed NE. The water temperature sensor 75 detects the temperature of cooling water for the internal combustion engine 10 and outputs a signal indicative of the cooling water temperature THW.

The atmospheric pressure sensor 77 detects a pressure in a portion of the intake path located between the air filter 42 and the throttle valve 43 (i.e., (substantially) atmospheric pressure) and outputs a signal indicative of the atmospheric pressure Pa. The accelerator opening sensor 78 detects the travel Accp of an accelerator pedal 91 to be operated by a driver and outputs a signal indicative of the travel Accp. The pressure sensor 79, which serves as the pressure detection means, detects pressure in a portion of the secondary air supply path 61 located upstream of the ASV 63 and outputs a signal indicative of pressure as measured upstream of the ASV 63 (hereinafter referred as the "ASV upstream pressure") Pai.

An electric control device 80 is a microcomputer, which includes the following mutually bus-connected elements: a CPU 81; ROM 82, in which routines (programs) to be executed by the CPU 81, tables (lookup tables or maps), constants, and the like are stored beforehand; RAM 83, in which the CPU 81 stores data temporarily as needed; backup RAM 84, which stores data while power is held on and which retains the stored data even while power is held off; and an interface 85 including AD converters. The interface 85 is connected to the sensors 71 to 79. Signals from the sensors 71 to 79 are supplied to the CPU 81 through the interface 85. The CPU 81 sends, through the interface 85, respective drive signals to the actuator 33a of the variable intake timing unit 33, the igniter 38, the injector 39, the throttle valve actuator 43a, the air pump 62 (an unillustrated electric motor for driving the same), and the solenoid valve 66. The CPU 81 also sends, through the interface 85, an instruction signal for lighting an alarm lamp 92 to the alarm lamp 92 as needed in order to notify the user of anomaly in the secondary air supply system 60.

Outline of Secondary Air Supply Control (AI):

When the temperature of the catalytic converter 53, which is a three-way catalytic converter, disposed in the exhaust path of the internal combustion engine 10 is lower than an activation temperature needed for the catalytic converter 53 to exhibit its catalytic function, the catalytic converter 53 fails to sufficiently exhibit its exhaust purification function. Therefore, at the time of cold start when the temperature of the catalytic converter 53 is lower than the activation temperature, the catalytic converter 53 must be warmed up as soon as possible.

The catalytic converter 53 can be actively warmed up by supplying secondary air to a portion of the exhaust path located upstream of the catalytic converter 53 to thereby apply to the catalytic converter 53 heat of reaction that is generated when oxygen contained in the secondary air oxidizes unburnt components (particularly HC) contained in exhaust gas.

Thus, at the time of cold start, the CPU 81 causes the air pump 62 to run and the solenoid valve 66 to open (to change from the closed state to the open state) (thus causes the ASV 63 to open), thereby starting to perform the secondary air supply control. As a result of the air pump 62 rotating at a predetermined rotational speed, the pressure of air discharged from the air pump 62 (ASV upstream pressure Pai (the center value of the same)) increases from substantially atmospheric pressure to a predetermined air pump discharge pressure, and the discharged air (secondary air) passes through the ASV 63 and the reed valve 64 and is then supplied to a portion of the exhaust path located upstream of the catalytic converter 53.

Once started, the secondary air supply control continues over a predetermined duration required to warm up the catalytic converter 53 so long as the vehicle is in halt (specifically, the engine speed NE is maintained near the idling speed). When the predetermined duration elapses, the CPU 81 causes the air pump 62 to stop and the solenoid valve 66 to be closed (to change from the open state to the closed state) (thus causes the ASV 63 to be closed), thereby ending (stopping) the secondary air supply control. As a result, supply of secondary air to the exhaust path is stopped, and the ASV upstream pressure Pai (the center value of the same) drops again to substantially atmospheric pressure from the air pump discharge pressure.

When the secondary air supply control is performed, the air-fuel ratio of exhaust gas shifts slightly to the lean side, so that the purification efficiency of the catalytic converter 53 in relation to removal of $NO_x$ tends to drop, and thus the quantity of $NO_x$ emissions tends to increase. Thus, a vehicle running while secondary air supply control is being performed is undesirable. Therefore, in the case where a vehicle carrying the internal combustion engine 10 runs before the predetermined duration starting from the cold start elapses, the CPU 81 suspends the secondary air supply control for the period of time when the vehicle runs. Thus is outlined the secondary air supply control.

Outline of Anomaly Judgment Method for Secondary Air Supply System:

The secondary air supply path 61 is connected to the exhaust path of the internal combustion engine 10. Thus, when the ASV 63 is in the open state, exhaust pulsation, which unavoidably arises in the internal combustion engine 10, propagates into a portion of the secondary air supply path located upstream of the ASV 63 via the reed valve 64 and the ASV 63. As a result, the exhaust pulsation causes the ASV upstream pressure Pai to pulsate with a predetermined pulsation level. When the ASV 63 is in the closed state, the exhaust pulsation cannot propagate into a portion of the secondary air supply path located upstream of the ASV 63. As a result, the ASV upstream pressure Pai does not propagate. In other words, when the ASV upstream pressure Pai pulsates with a pulsation level equal to or higher than a predetermined reference pulsation level, this means that the ASV 63 is in the open state (in turn the secondary air supply path 61 is open); and when the ASV upstream pressure Pai pulsates with a pulsation level lower than the predetermined reference pulsation level (including the case where the same does not pulsate), this means that the ASV 63 is in the closed state (in turn the secondary air supply path 61 is closed).

When the air pump 62 is running, as mentioned above, the ASV upstream pressure Pai (the center value of the same) is maintained at the predetermined air pump discharge pressure. When the air pump 62 is in halt, the ASV upstream pressure Pai (the center value of the same) is maintained at substantially atmospheric pressure, since an upstream portion of the secondary air supply path 61 is connected to the intake path. In other words, when the ASV upstream pressure Pai is equal to or higher than the predetermined reference pressure Pref, which is lower than the air pump discharge pressure, this means that the air pump 62 is running; and when the ASV upstream pressure Pai is lower than the predetermined reference pressure Pref, this means that the air pump 62 is in halt.

Figure 3:
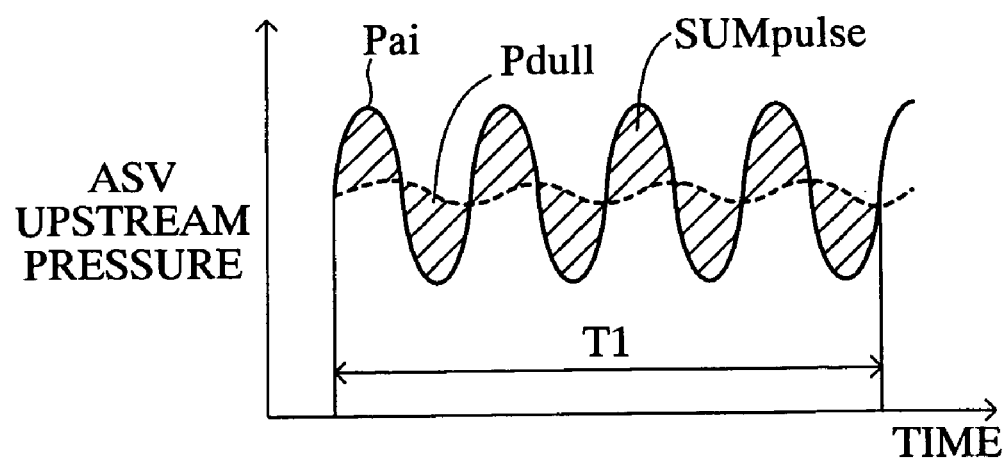
FIG. 3 is a view for explaining an integrated pulsation value by use of a graph showing a change in an ASV (air switching valve) upstream pressure and a dulled pressure with time.

The pulsation level of the ASV upstream pressure Pai can be represented by use of the integrated pulsation value SUMpulse expressed below by Expression 1. Specifically, the absolute value of the deviation between the ASV upstream pressure Pai (current pressure or instantaneous pressure) and the dulled pressure Pdull that follows the ASV upstream pressure Pai in a predetermined relation (in accordance with a dulling time constant) is obtained every arithmetic cycle of the CPU 81. The thus-obtained absolute value of the deviation is integrated over the predetermined period of time T1 The integrated pulsation value SUMpulse corresponds to the total area of hatched regions shown in FIG. 3 and increases with the pulsation level of the ASV upstream pressure Pai.

$$\text{SUMpulse} = \Sigma |Pai - Pdull| \text{ (interval of integration: } T1\text{)} \quad \text{Expression 1}$$

The predetermined period of time T1 (length of the same) is determined in accordance with the engine speed NE as measured at the starting point of the predetermined period of time T1 The starting point of the predetermined period of time T1 is each of the starting point and end point of secondary air supply control. The dulled pressure (current value of the same) Pdull is calculated every arithmetic cycle of the CPU 81 in accordance with Expression 2 shown below. In Expression 2, Pai is the current value of the ASV upstream pressure (value obtained at the current point of calculation); Pdullb is the last value of dulled pressure; and T is a dulling time constant (>1 (constant value)). The current dulled pressure Pdull is calculated on the basis of the deviation between the current ASV upstream pressure Pai and the last dulled pressure Pdullb.

$$Pdull = (1/T) \cdot (Pai - Pdullb) + Pdullb \quad \text{Expression 2}$$

Figure 4:
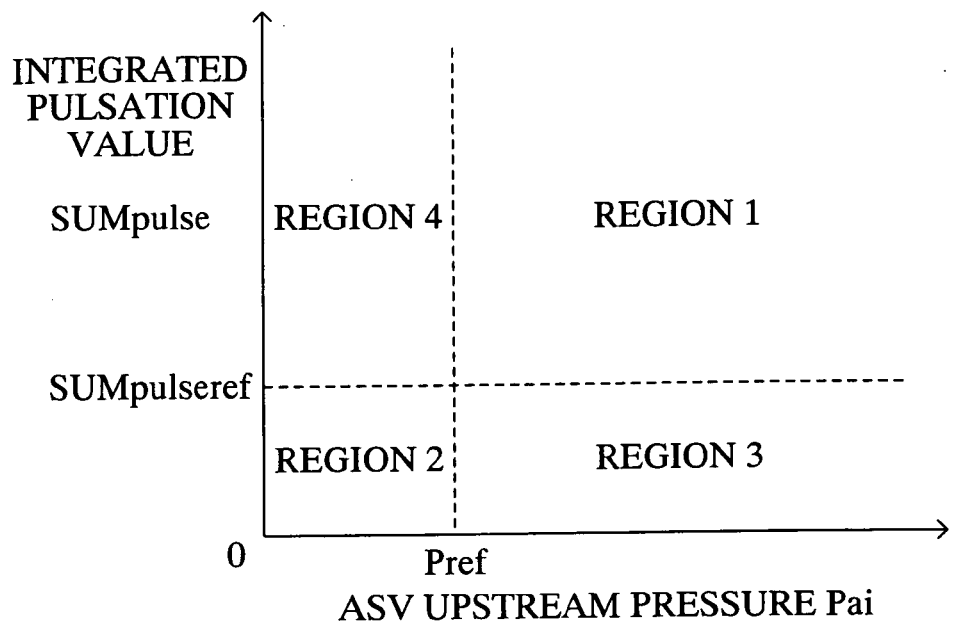
FIG. 4 is a map that the CPU shown in FIG. 1 references when judging whether or not the secondary air supply system is anomalous.

Thus, in the case where the CPU 81 instructs the secondary air supply system 60 to perform secondary air supply control (specifically, the CPU 81 instructs the air pump 62 to run and the solenoid valve 66 to open), if the air pump 62 and the ASV 63 (and other component parts) are normal (and a sufficiently high ASV drive pressure Pdv is applied to the ASV 63), the ASV upstream pressure Pai and the integrated pulsation value SUMpulse must assume values falling within region 1 shown in FIG. 4 (i.e., the ASV upstream pressure Pai is equal to or higher than the reference pressure Pref, and the integrated pulsation value SUMpulse is equal to or greater than the reference integrated-pulsation-value SUMpulseref, which corresponds to the aforementioned predetermined reference pulsation level). By contrast, in the case where the CPU 81 instructs the secondary air supply system 60 to stop secondary air supply control (specifically, the CPU 81 instructs the air pump 62 to stop running and the solenoid valve 66 to close), if the air pump 62 and the ASV 63 (and other component parts) are normal, the ASV upstream pressure Pai and the integrated pulsation value SUMpulse must assume values falling within region 2 shown in FIG. 4 (i.e., the ASV upstream pressure Pai is lower than the reference pressure Pref, and the integrated pulsation value SUMpulse is smaller than the reference integrated-pulsation-value SUMpulseref).

Thus, every time secondary air supply control starts or ends (specifically, when the CPU 81 issues an instruction to perform secondary air supply control or when the CPU 81 issues an instruction to stop secondary air supply control), the anomaly judgment apparatus (hereinafter may be referred to as the "present apparatus") for a secondary air supply system according to the present invention starts once an anomaly judgment process (specifically, a process for integrating the aforementioned deviation over the predetermined period of time T1 in order to obtain the integrated pulsation value SUMpulse) for judging whether or not the secondary air supply system 60 is anomalous. Every time the predetermined period of time T1 elapses, the anomaly judgment apparatus judges whether or not the secondary air supply system 60 is anomalous, as described below.

<In the Case Where the CPU 81 Has Issued an Instruction to Perform Secondary Air Supply Control>

In this case, when the ASV upstream pressure Pai and the integrated pulsation value SUMpulse assume values falling within region 1 shown in FIG. 4, the present apparatus judges that the secondary air supply system 60 is normal. When the Pai and SUMpulse values fall outside region 1 shown in FIG. 4, the present apparatus judges that the secondary air supply system 60 is anomalous.

When the Pai and SUMpulse values fall within region 2 shown in FIG. 4, this indicates the occurrence of such an anomaly that, for example, the air pump 62 fails to run, and the ASV 63 fails to open (the ASV 63 is fixed in the closed state). When the Pai and SUMpulse values fall within region 3 shown in FIG. 4, this indicates the occurrence of such an anomaly that, for example, the ASV 63 fails to open. When the Pai and SUMpulse values fall within region 4 shown in FIG. 4, this indicates the occurrence of such an anomaly that, for example, the air pump 62 fails to run.

<In the Case Where the CPU 81 Has Issued an Instruction to Stop Secondary Air Supply Control>

In this case, when the ASV upstream pressure Pai and the integrated pulsation value SUMpulse assume values falling within region 2 shown in FIG. 4, the present apparatus judges that the secondary air supply system 60 is normal. When the Pai and SUMpulse values fall outside region 2 shown in FIG. 4, the present apparatus judges that the secondary air supply system 60 is anomalous.

When the Pai and SUMpulse values fall within region 1 shown in FIG. 4, this indicates the occurrence of such an anomaly that, for example, the air pump 62 fails to stop, and the ASV 63 fails to close (the ASV 63 is fixed in the open state). When the Pai and SUMpulse values fall within region 3 shown in FIG. 4, this indicates the occurrence of such an anomaly that, for example, the air pump 62 fails to stop. When the Pai and SUMpulse values fall within region 4 shown in FIG. 4, this indicates the occurrence of such an anomaly that, for example, the ASV 63 fails to close. When the present apparatus completes the judgment once each in the case where an instruction to perform secondary air supply control is issued and in the case where an instruction to stop secondary air supply control is issued, since then, the present apparatus does not perform the judgment process until the operation of the internal combustion engine 10 ends. Means for judging as described above whether or not the secondary air supply system 60 is anomalous corresponds to the anomaly judgment means.

Outline of Prohibition of Anomaly Judgment Because of Insufficiency of Negative Pressure:

As described previously, the ASV 63 is opened when its valve element is urged in the open direction by means of drive force corresponding to the ASV drive pressure Pdv (=Pa−Pm) against the urging force of the spring in the close direction. In other words, the opening area Sa of the ASV 63 changes in accordance with the ASV drive pressure Pdv.

Figure 5:
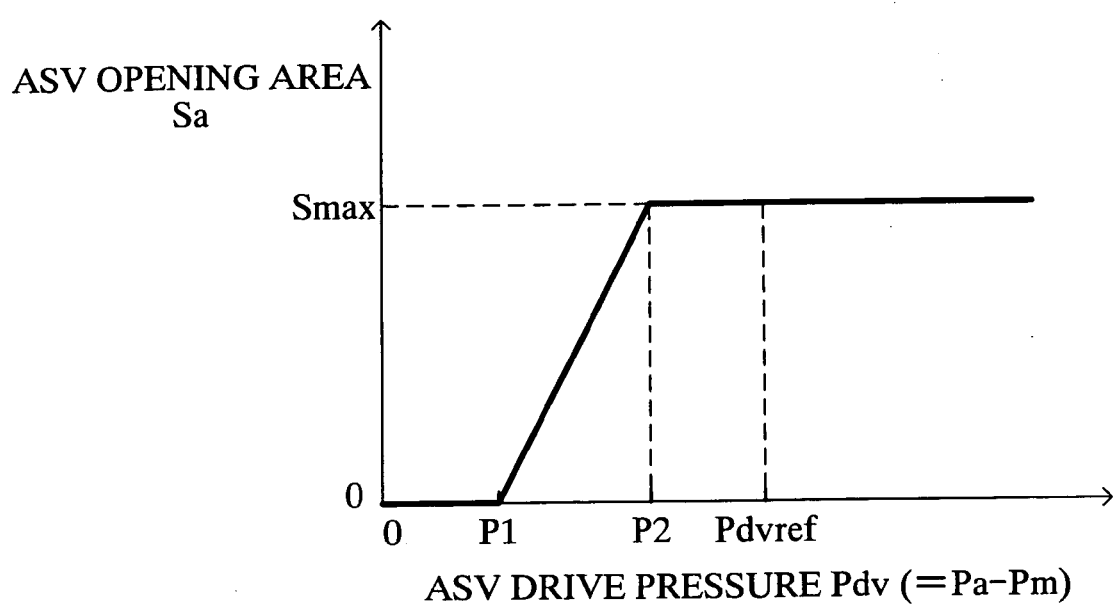
FIG. 5 is a graph showing the relationship (static characteristic) between an ASV drive pressure (pressure obtained by subtracting throttle valve downstream pressure from atmospheric pressure) and an opening area of the ASV.

More specifically, FIG. 5 is a graph showing the relationship (static characteristic) between the ASV drive pressure Pdv and the opening area Sa of the ASV 63. As shown in FIG. 5, the opening area Sa of the ASV 63 is maintained at zero when the ASV drive pressure Pdv is less than P1, and increases from zero to the maximum opening area Smax as the ASV drive pressure Pdv increases from P1 to P2. When the ASV drive pressure Pdv exceeds P2, the opening area Sa of the ASV 63 is maintained at the maximum opening area Smax.

Accordingly, in order to reliably open the ASV 63 (stably maintain the opening area Sa at the maximum opening area Smax) when the above-described CPU 81 issues an instruction for performing secondary air supply control, the throttle valve downstream pressure Pm must be a sufficiently low, stable pressure (i.e., the ASV drive pressure Pdv must be a sufficiently high, stable pressure (e.g., pressure higher than the above-mentioned pressure P2 in FIG. 5) at the time when the instruction is issued.

Incidentally, the throttle valve downstream pressure Pm changes depending on the throttle valve opening TA, etc. of the engine 10. Further, stemming from the action of the serge tank S, the throttle valve downstream pressure Pm has characteristics such that once the pressure becomes high, the pressure does not immediately decrease to a sufficiently low pressure.

As can be understood from the above, if the CPU 81 issues an instruction for performing secondary air supply control in a state in which the throttle valve downstream pressure Pm is relatively high, for example, immediately after the end of traveling of the vehicle or immediately after cold start, even when the ASV 63 is normal, a state in which the ASV 63 is not opened reliably and the ASV upstream pressure Pai does not pulsate in accordance with exhaust pulsation may continue for a certain period subsequent to the issuance of the instruction. Accordingly, if the above-described anomaly judgment process is started simultaneously with the issuance of the instruction in such a state, the integrated pulsation value SUMpulse calculated by the aforementioned Expression 1 can differ from (be smaller than) a value stemming from exhaust pulsation. Thus, when the calculated integrated pulsation value SUMpulse is used as a basis for judging whether or not the secondary air supply system 60 is anomalous, a false judgment may result.

Meanwhile, in order to guarantee without fail that the throttle valve downstream pressure Pm becomes a sufficiently low, stable pressure (i.e., the ASV drive pressure Pdv becomes a sufficiently high, stable pressure) at the time when the anomaly judgment process is started, the anomaly judgment process is preferably started after a state in which the ASV drive pressure Pdv (=Pa−Pm) is higher than a threshold value Pdvref (see FIG. 5) slightly higher than the above-described pressure P2 has continued for a predetermined period of time T2.

Figure 6:
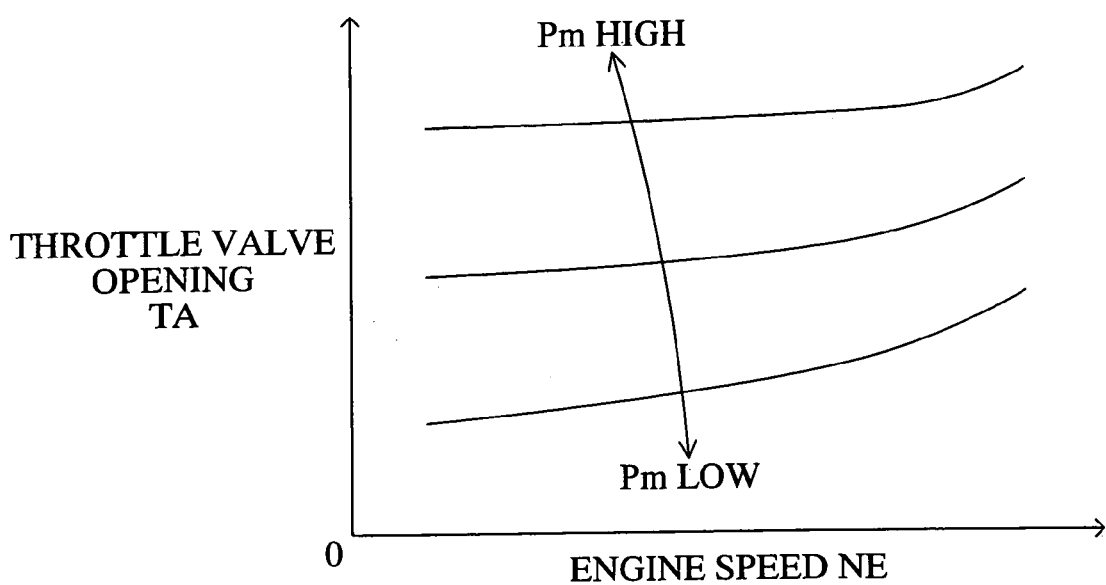
FIG. 6 is a graph representing a table for obtaining the throttle valve downstream pressure from an engine speed and a throttle valve opening.

FIG. 6 is a graph representing a table for obtaining the throttle valve downstream pressure Pm from the engine speed NE and the throttle valve opening TA. As shown in FIG. 6, the throttle valve downstream pressure Pm, which is necessary to obtain the ASV drive pressure Pdv, can be determined on the basis of the engine speed NE and the throttle valve opening TA. As seen from FIG. 6, the throttle valve downstream pressure Pm increases as the throttle valve opening TA increases or as the engine speed NE decreases. Further, the atmospheric pressure Pa necessary for obtaining the ASV drive pressure Pdv is obtained on the basis of the output of the atmospheric pressure sensor 77. In actuality, the atmospheric pressure to be used for obtaining the ASV drive pressure Pdv is stored (updated) as atmospheric pressure Pa0 every time an unillustrated ignition switch IG is changed from "OFF" to "ON."

Thus, after a point of time when the above-described anomaly judgment process is started upon starting or ending of secondary air supply control, the present apparatus determines (estimates) the throttle valve downstream pressure Pm on the basis of the engine speed NE determined from the output of the crank position sensor 74, the throttle valve opening TA detected by the throttle position sensor 72, the table shown in FIG. 6 (throttle-valve-downstream-pressure acquisition means). Subsequently, the present apparatus obtains the ASV drive pressure Pdv by subtracting the throttle valve downstream pressure Pm from the atmospheric pressure PaO, and judges whether a state in which the ASV drive pressure Pdv is higher than the threshold value Pdvref continues for the predetermined period of time T2. When the state in which the ASV drive pressure Pdv is higher than the threshold value Pdvref does not continue for the predetermined period of time T2, the present apparatus stops the above-described anomaly judgement process (i.e., prohibits the above-described judgment). Thus, the means for judging that the above-described negative pressure is not sufficiently secured when the state in which the ASV drive pressure Pdv is higher than the threshold value Pdvref does not continue for the predetermined period of time T2 corresponds to the negative pressure judgment means, and the means for prohibiting judgment by the anomaly judgment prohibition means corresponds to the anomaly judgment prohibition means.

The present apparatus substantially starts the above-described anomaly judgement process, provided that the state in which the ASV drive pressure Pdv is higher than the threshold value Pdvref has continued for the predetermined period of time T2. Specifically, after the above-mentioned state has continued for the predetermined period of time T2, the present apparatus sets the predetermined period of time T1 in accordance with the engine speed NE as measured at the point of time; initializes the integrated pulsation value SUMpulse to zero; and begins at the point of time to integrate the aforementioned deviation over the set period of time T1 in order to obtain the integrated pulsation value SUMpulse. When the set predetermined period of time T1 elapses, the present apparatus makes the above-described judgment on the basis of the currently obtained integrated pulsation value SUMpulse.

Figure 7:
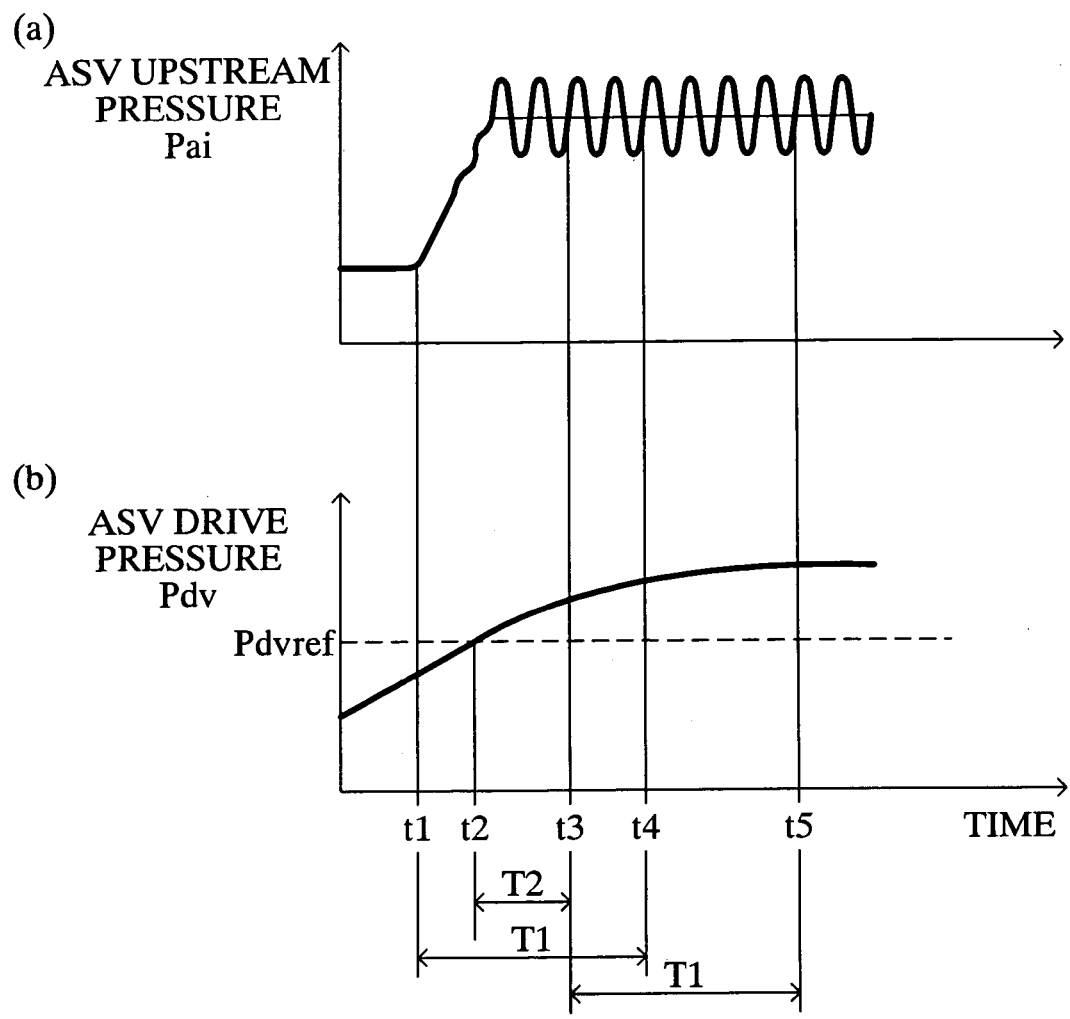
FIG. 7 is a timing chart showing example changes in (a) ASV upstream pressure and (b) ASV drive pressure in the case where the secondary air supply system is normal, and secondary air supply control is started at time t1.

FIG. 7 is a timing chart showing example changes in the ASV upstream pressure Pai and the ASV drive pressure Pdv in the case where the secondary air supply system 60 is normal, and the secondary air supply control has been started at time t1. As shown in FIG. 7(b), this time chart shows the case where the secondary air supply control is started in a state in which the ASV drive pressure Pdv has become lower than the threshold value Pdvref (i.e., the throttle valve downstream pressure Pm has become relatively high), for example, immediately after the end of traveling of the vehicle or immediately after cold start, and then the ASV drive pressure Pdv gradually increases (accordingly, the throttle valve downstream pressure Pm decreases).

As shown in FIG. 7(a), up to time t1, the air pump 62 is in halt, and the ASV 63 is in the closed state; thus, exhaust pulsation does not propagate into a portion of the secondary air supply path 61 located upstream of the ASV 63. Accordingly, the ASV upstream pressure Pai is maintained at near atmospheric pressure. When secondary air supply control is started at time t1, the air pump 62 is started, and the solenoid valve 66 is opened (is changed from the open state to the closed state), whereby the throttle valve downstream pressure Pm is applied to the ASV 63. In other words, application of the ASV drive pressure Pdv to the ASV 63 is started. As a result, after time t1, the ASV upstream pressure Pai increases from the near atmospheric pressure to the aforementioned predetermined air pump discharge pressure, as the rottional of the air pump 62 increases. Meanwhile, at time t1, the ASV drive pressure Pdv is still low, and the ASV 63 is not reliably opened, so that a state in which the ASV upstream pressure Pai does not pulsate continues for a short period of time after time t1. At around time t2 at which the ASV drive pressure Pdv exceeds the threshold value Pdvref, the opening area of the ASV 63 approaches the maximum opening area Smax, whereby the ASV upstream pressure Pai gradually starts pulsating. After that, since the opening area of the ASV 63 is maintained at the maximum opening area Smax, the ASV upstream pressure Pai continuously pulsates stemming from exhaust pulsation.

Here, the above-described anomaly judgment process (i.e., integration of the above-described deviation) is assumed to have been started at time t1, which is the starting point of secondary air supply control. In this case, the integrated pulsation value SUMpulse, which is obtained through integration of the deviation over the predetermined period of time T1 between time t1 and time t4, assumes a value in which is reflected the result of integration of the deviation which is calculated as a small value in a period in which the ASV upstream pressure Pai does not pulsate. Accordingly, although the integrated pulsation value SUMpulse must be equal to or higher than the reference integrated-pulsation-value SUMpulseref, the integrated pulsation value SUMpulse may possibly be lower than the reference integrated-pulsation-value SUMpulseref. As a result, the secondary air supply system 60 may erroneously be judged to be anomalous, even if the secondary air supply system 60 is normal.

In contrast, the present apparatus does not substantially start the above-described anomaly judgment process up to time t3; i.e., until the state in which the ASV drive pressure Pdv is higher than the threshold value Pdvref has continued for the predetermined period of time T2. Subsequently, at time t3, the present apparatus substantially starts the above-described anomaly judgment process. Specifically, the present apparatus sets the predetermined period of time T1 in accordance with the engine speed NE at time t3, and begins at time t3 to integrate the deviation over the set period of time T1 (between time t3 and time t5) in order to obtain the integrated pulsation value SUMpulse. At time t5, the present apparatus judges, on the basis of the integrated pulsation value SUMpulse, whether or not the secondary air supply system 60 is anomalous. Accordingly, during execution of the secondary air supply control, it is guaranteed that the integrated pulsation value SUMpulse is calculated in a state in which a sufficient ASV drive pressure Pdv required to reliably open the ASV 63 is applied to the ASV 63. As a result, the above-described erroneous judgment, which would otherwise be made because of insufficient negative pressure, can be prevented.

Actual Operation:

The actual operation of the thus-configured anomaly judgment apparatus for a secondary air supply system will next be described with reference to FIGS. 8 to 12, which are flowcharts showing routines to be executed by the CPU 81 of the electric control device 80.

Figure 8:
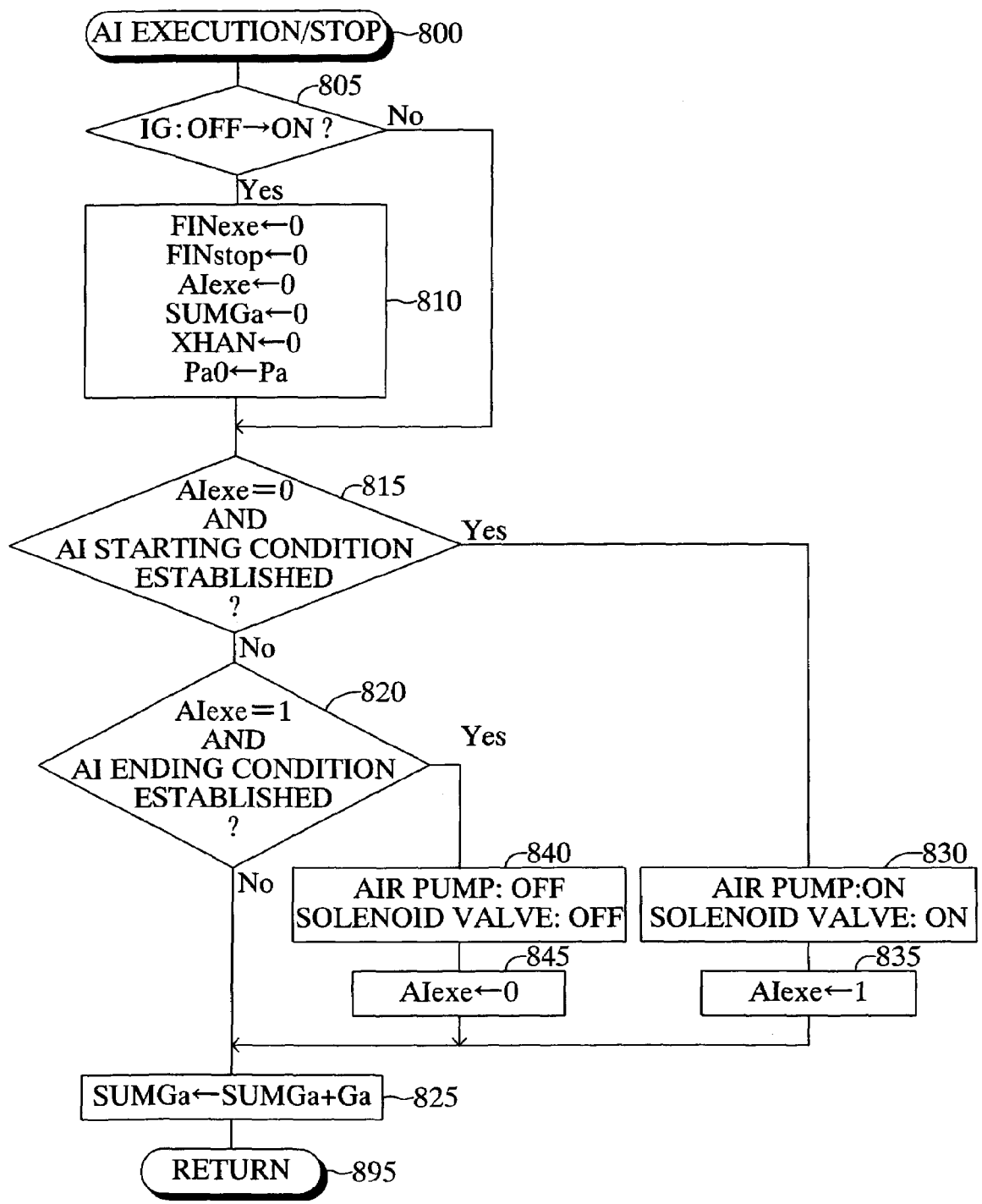
FIG. 8 is a flowchart showing a routine that the CPU shown in FIG. 1 executes for controlling execution and stop of AI (secondary air supply control)

Every time a predetermined time elapses, the CPU 81 executes the routine shown in FIG. 8 for controlling execution and stop of secondary air supply control. When predetermined timing is reached, the CPU 81 starts processing from step 800 and proceeds to step 805. In step 805, the CPU 81 judges whether or not the ignition switch IG is changed over in position from OFF to ON.

The following description assumes that a driver has just changed over the ignition switch IG from OFF to ON. In step 805, the CPU 81 makes a "Yes" judgment and proceeds to step 810. In step 810, the CPU 81 initializes relevant flags and variable to "0." Further, the atmospheric pressure Pa detected by the atmospheric pressure sensor 77 is stored as the atmospheric pressure Pa0. When the value of the judgment during-AI-in-execution completion flag FINexe is "1," this indicates completion of the judgment in the case where the CPU 81 has issued an instruction to perform AI (hereinafter the case is referred to as "during AI in execution"). When the value of the FINexe flag is "0," this indicates that the judgment during AI in execution is not completed. When the value of the judgment during-AI-in-halt completion flag FINstop is "1," this indicates completion of the judgment in the case where the CPU 81 has issued an instruction to stop AI (hereinafter the case is referred to as "during AI in halt"). When the value of the FINstop flag is "0," this indicates that the judgment during AI in halt is not completed. When the value of the AI-in-execution flag AIexe is "1," this indicates that AI is in execution. When the value of the AIexe flag is "0," this indicates that AI is in halt. When the value of the anomaly-judgment-process-in-execution flag XHAN is "1," this indicates that the anomaly judgment process (specifically, integration of the deviation for obtaining the integrated pulsation value SUMpulse) is performed. When the value of the XHAN flag is "0," this indicates that the anomaly judgment process is not performed. The integrated intake air flow rate SUMGa is an integrated value of the intake air flow rate Ga.

Next, the CPU 81 proceeds to step 815 and judges whether or not the value of the AIexe flag is "0" and the AI starting condition is established. The AI starting condition is established, for example, when the cooling water temperature THW is equal to or lower than a predetermined temperature, and the ignition switch IG is changed over from ON to START (a cold start is performed) or when the cooling water temperature THW is equal to or lower than the predetermined temperature, the integrated intake air flow rate SUMGa does not reach the reference integrated-intake-air-flow-rate SUMGaref corresponding to the predetermined duration, and the engine speed NE is maintained near the idling speed for the predetermined period of time.

At the moment, the ignition switch IG has just been changed over from OFF to ON (i.e., the internal combustion engine 10 is not started yet), and thus the AI starting condition is not established. Therefore, the CPU 81 makes a "No" judgment in step 815 and proceeds to step 820. In step 820, the CPU 81 judges whether or not both of the following conditions are established: the value of the AI-in-execution flag AIexe is "1," and the AI ending condition is established. The AI ending condition is established, for example, when the engine speed NE is maintained at a predetermined running speed, which is higher than the idling speed, for a predetermined period of time (when the vehicle starts running) or when the integrated intake air flow rage SUMGa reaches the reference integrated-intake-air-flow-rate SUMGaref.

At the moment, since the value of the AI-in-execution flag AIexe is "0," the CPU 81 also makes a "No" judgment in step 820 and proceeds to step 825. In step 825, the CPU 81 adds the intake air flow rate Ga measured by the air flowmeter 71 to the integrated intake air flow rate SUMGa at that point of time, and sets the obtained sum as a new integrated intake air flow rate SUMGa. Then, the CPU 81 proceeds to step 895 and ends the present routine for the present. Subsequently, unless a cold start is performed, the CPU 81 repeatedly executes the processes of steps 800, 805, and 815–825.

It is supposed that the ignition switch IG is now changed over from ON to START to thereby perform a cold start. In this case, the CPU 81 makes a "Yes" judgment in step 815 and proceeds to step 830. In step 830, the CPU 81 instructs the secondary air supply system 60 to perform AI (specifically, the CPU 81 instructs the air pump 62 to run and the solenoid valve 66 to open). Then, the CPU 81 proceeds to step 835 and sets the AI-in-execution flag AIexe to "1." Subsequently, the CPU 81 proceeds to steps 825 and 895 and ends the present routine for the present. Thus, execution of AI starts.

After this, since the value of the AI-in-execution flag AIexe is "1," the CPU 81 repeatedly executes the processes of steps 800, 805, and 815–825 until the AI ending condition is established.

Next, judgment on start of the anomaly judgment process will be described. The CPU 81 repeatedly executes the routine shown in FIG. 9 every time a predetermined time elapses. Therefore, when predetermined timing is reached, the CPU 81 starts processing from step 900 and proceeds to step 905. In step 905, the CPU 81 judges whether or not the anomaly-judgment-process-in-execution flag XHAN is set to "0."

At the moment, since the value of the anomaly-judgment-process-in-execution flag XHAN is "0," the CPU 81 makes a "Yes" judgment in step 905 and proceeds to step 910. In step 910, the CPU 81 judges whether or not the following condition (a) or (b) is established: (a) the value of the AI-in-execution flag AIexe changes from "0" to "1" and the value of the judgment during-AI-in-execution completion flag FINexe is "0"; and (b) the value of the AI-in-execution flag AIexe changes from "1" to "0" and the value of the judgment during-AI-in-halt completion flag FINstop is "0." In other words, the CUP 81 judges whether or not an instruction to execute AI during AI in halt is issued in a state in which the judgment during AI in execution is not completed or whether or not an instruction to stop AI during AI in execution is issued in a state in which the judgment during AI in halt is not completed. When the CPU 81 makes a "No" judgment, the CPU 81 immediately proceeds to step 995 and ends the present routine for the present.

It is supposed that the step 835 has just been executed. In this case, since at the moment the value of the judgment during-AI-in-execution completion flag FINexe is "0," the CPU 81 makes a "Yes" judgment in step 910 and proceeds to step 915. In step 915, the CPU 81 sets the anomaly-judgment-process-in-execution flag XHAN to "1." In the subsequent step 920, the CPU 81 obtains the reference-value for judgment on end-of-anomaly-judgment-process Nref corresponding to the predetermined period of time T1 on the basis of the current engine speed NE and the function g of the engine speed NE.

Next, the CPU 81 proceeds to step 925. In step 925, the CPU 81 initializes all of the counter value M, the counter value N, which is used in a routine to be described later, the anomaly judgment process end flag FIN, and the integrated pulsation value SUMpulse to "0," and stores the current ASV upstream pressure Pai as the last dulled pressure Pdullb in order to prepare for calculation of a dulled pressure. Subsequently, the CPU 81 proceeds to step 995 and ends the present routine for the present. Notably, when the value of the anomaly judgment process end flag FIN is "1," this indicates that the anomaly judgment process is ended; and when the value of the anomaly judgment process end flag FIN is "0," this indicates that the anomaly judgment process is not ended. As a result, the anomaly-judgment-process-in-execution flag XHAN is set to "1." Thus, after this, the CPU 81 makes a "No" judgment in step 905 and proceeds to step 930. Unless the value of the AI-in-execution flag AIexe changes while the anomaly judgment process is in execution, the CPU 81 makes a "No" judgment in step 930 and proceeds to step 995. The case where the value of the AI-in-execution flag AIexe changes while the anomaly judgment process is in execution will be described later.

Next, calculation of an integrated pulsation value will be described. The CPU 81 repeatedly executes the routine shown in FIG. 10 every time a predetermined time elapses. Therefore, when predetermined timing is reached, the CPU 81 starts processing from step 1000 and proceeds to step 1005. In step 1005, the CPU 81 judges whether or not the anomaly-judgment-process-in-execution flag XHAN is set to "1." When the CPU 81 makes a "No" judgment, the CPU 81 immediately proceeds to step 1095 and ends the present routine for the present.

It is supposed that the step 915 has just been executed. In this case, the value of the anomaly-judgment-process-in-execution flag XHAN is "1." Thus, the CPU 81 makes a "Yes" judgment in step 1005 and proceeds to step 1010. In step 1010, the CPU 81 calculates the current dulled pressure Pdull in accordance with the above-described Expression 2, and on the basis of the current ASV upstream pressure Pai and the last dulled pressure Pdullb. The last dulled pressure Pdullb to be used in the present step 1010 is a value that has been stored in the previous step 925.

Next, the CPU 81 proceeds to step 1015. In step 1015, the CPU 81 obtains the deviation Pulse by subtracting the current dulled pressure Pdull from the current ASV upstream pressure Pai. In the subsequent step 1020, the CPU 81 adds the absolute value of the deviation Pulse to the current integrated pulsation value SUMpulse (currently "0" as a result of execution of the previous step 925) and sets the obtained sum as a new integrated pulsation value SUMpulse (updates the integrated pulsation value SUMpulse).

Next, the CPU 81 proceeds to step 1025 and increments the current counter value N (currently "0" as a result of execution of the previous step 925) by "1" and sets the obtained value as a new counter value N. In the subsequent step 1030, the CPU 81 judges whether or not the counter value N is less than the reference-value for judgment on end-of-anomaly-judgment-process Nref that has been set in the previous step 920. That is, the counter value N indicates duration starting from a point of time when the anomaly judgment process has started, and the CPU 81 judges whether or not duration indicated by the counter value N has reached the predetermined period of time T1.

At the moment, since the counter value N is "1" and less than the reference-value for judgment on end-of-anomaly-judgment-process Nref, the CPU 81 makes a "Yes" judgment in step 1030 and proceeds to step 1035. In step 1035, the CPU 81 stores the current dulled pressure Pdull, which has been obtained in step 1010, as the last dulled pressure Pdullb. Subsequently, the CPU 81 proceeds to step 1095 and ends the present routine for the present.

After this, so long as the CPU 81 judges in the below described routine that the state in which the ASV drive pressure Pdv is higher than the threshold value Pdvref has continued for the predetermined period of time T2 or more, the CPU 81 repeatedly executes the processes of steps 1000–1035 until the counter value N, which increases by repeated execution of the process of step 1025, reaches the reference-value for judgment on end-of-anomaly-judgment-process Nref. In this manner, calculation of the integrated pulsation value SUMpulse continues. When the predetermined period of time T1 elapses, and thus the counter value N reaches the reference-value for judgment on end-of-anomaly-judgment-process Nref, the CPU 81 makes a "No" judgment in step 1030 and proceeds to step 1040. In step 1040, the CPU 81 sets the anomaly-judgment-process-in-execution flag XHAN to "0." In the subsequent step 1045, the CPU 81 sets the anomaly judgment process end flag FIN to "1." Then, the CPU 81 proceeds to step 1095 and ends the present routine for the present.

After this, since the value of the anomaly-judgment-process-in-execution flag XHAN is "0," the CPU 81 makes a "No" judgment in step 1005 and immediately proceeds to step 1095; thus, calculation of the integrated pulsation value SUMpulse ends. The CPU 81 again makes a "Yes" judgment in step 905 of FIG. 9 and proceeds to step 910. In step 910, the CPU 81 monitors whether or not the AI-in-execution flag AIexe is changed from current "1" to "0."

Figure 11:
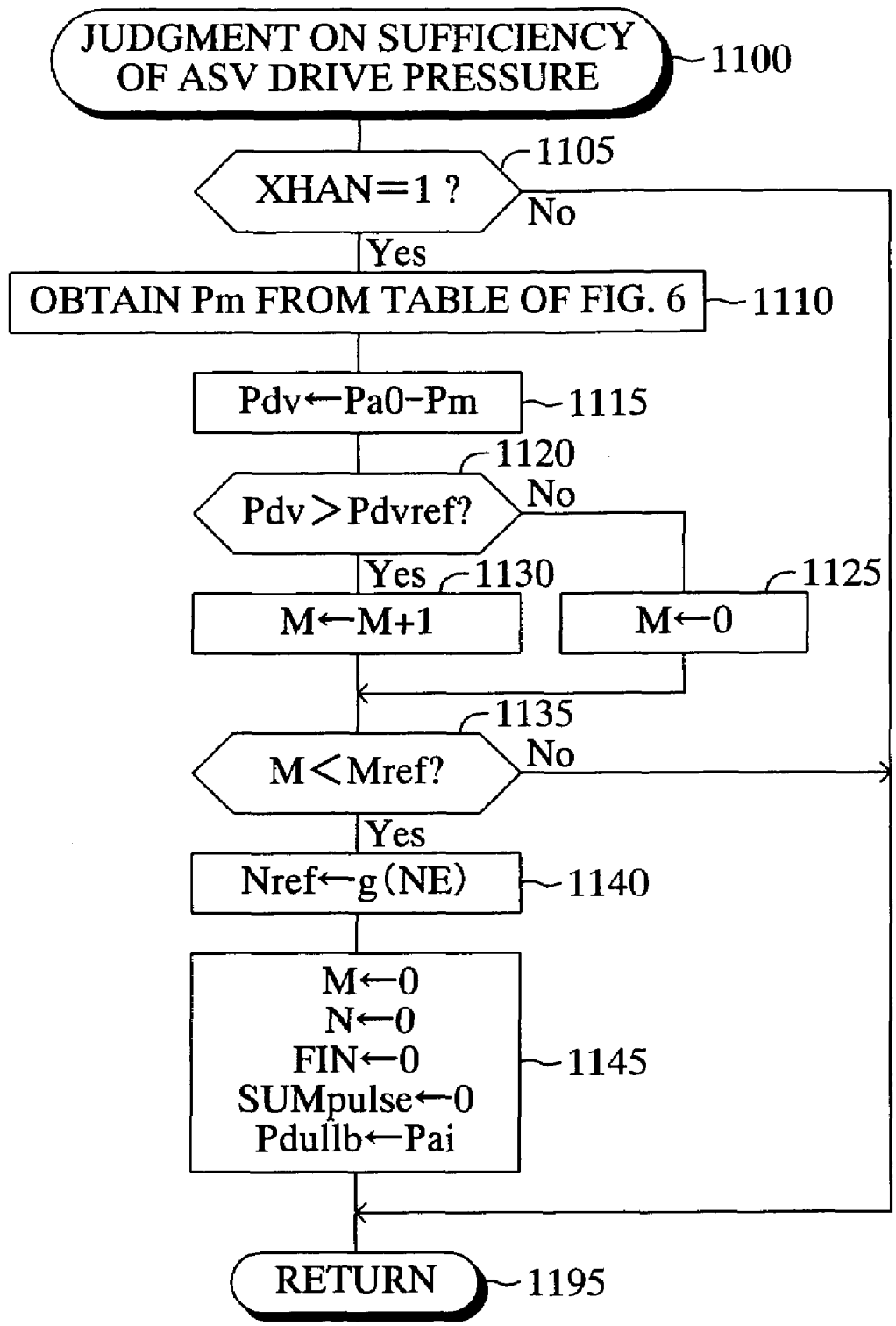
FIG. 11 is a flowchart showing a routine that the CPU shown in FIG. 1 executes for making judgment on sufficiency of ASV drive pressure.

Meanwhile, in order to make judgment on sufficiency of the ASV drive pressure Pdv, the CPU 81 repeatedly executes the routine shown in FIG. 11 every time a predetermined time elapses. Therefore, when predetermined timing is reached, the CPU 81 starts processing from step 1100 and proceeds to step 1105. In step 1105, the CPU 81 judges whether or not the value of the anomaly-judgment-process-in-execution flag XHAN is "1." In the case where the CPU 81 makes a "No" judgment in step 1105, the CPU 81 immediately proceeds to step 1195 and ends the present routine for the present.

It is supposed that the step 915 has just been executed. In this case, the value of the anomaly-judgment-process-in-execution flag XHAN is "1." Thus, the CPU 81 makes a "Yes" judgment in step 1105 and proceeds to step 1110. In step 1110, the CPU 81 obtains the throttle valve downstream pressure Pm on the basis of the current engine speed NE, the current throttle valve opening TA, and the table of FIG. 6. In subsequent step 1115, the CPU 81 subtracts the throttle valve downstream pressure Pm from the atmospheric pressure Pa0, to thereby obtain the ASV drive pressure Pdv.

Next, the CPU 81 proceeds to step 1120 and judges whether or not the ASV drive pressure Pdv is higher than the threshold value Pdvref. In the case where in step 1120 the CPU 81 makes a "No" judgment, the CPU 81 proceeds to step 1125; clears the counter value M to "0" in step 1125; and then proceeds to step 1135. In the case where in step 1120 the CPU 81 makes a "Yes" judgment, the CPU 81 proceeds to step 1130; increments the current counter value M by "1" in step 1130 (at the moment, the counter value M is "0" because of the process in the previous step 925); and then proceeds to step 1135. Therefore, the counter value M indicates the duration of the state in which the value of the anomaly-judgment-process-in-execution flag XHAN is "1" and the ASV drive pressure Pdv is higher than the threshold value Pdvref.

In step 1135, the CPU 81 judges whether or not the counter value M is equal to or less than the reference-value for judgment on sufficiency of ASV drive pressure Mref corresponding to the predetermined period of time T2 (i.e., whether or not the duration of the state in which the ASV drive pressure Pdv is higher than the threshold value Pdvref is shorter than the predetermined period of time T2).

In the case where in step 1135 the CPU 81 makes a "No" judgment (i.e., the duration of the state in which the ASV drive pressure Pdv is higher than the threshold value Pdvref is equal to or longer than the predetermined period of time T2), the CPU 81 immediately proceeds to step 1195 and ends the present routine for the present. Meanwhile, when the state in which the ASV drive pressure Pdv is higher than the threshold value Pdvref is shorter than the predetermined period of time T2 and the counter value M is less than the reference-value for judgment on sufficiency of ASV drive pressure Mref (refer to the period between time t1 and time t3 in FIG. 7), the CPU 81 makes a "Yes" judgment in step 1135 and executes the processes of steps 1140 and 1145, which are the same as the previous steps 920 and 925, respectively. Subsequently, the CPU 81 proceeds to step 1195 and ends the present routine for the present. Thus, the integrated pulsation value SUMpulse, the counter value N, and the like are once cleared to "0." That is, during AI in execution (during AI in halt as well), calculation of the integrated pulsation value SUMpulse is continued only when the state in which the ASV drive pressure Pdv is higher than the threshold value Pdvref continues for the predetermined period of time T2 or more.

Figure 10:
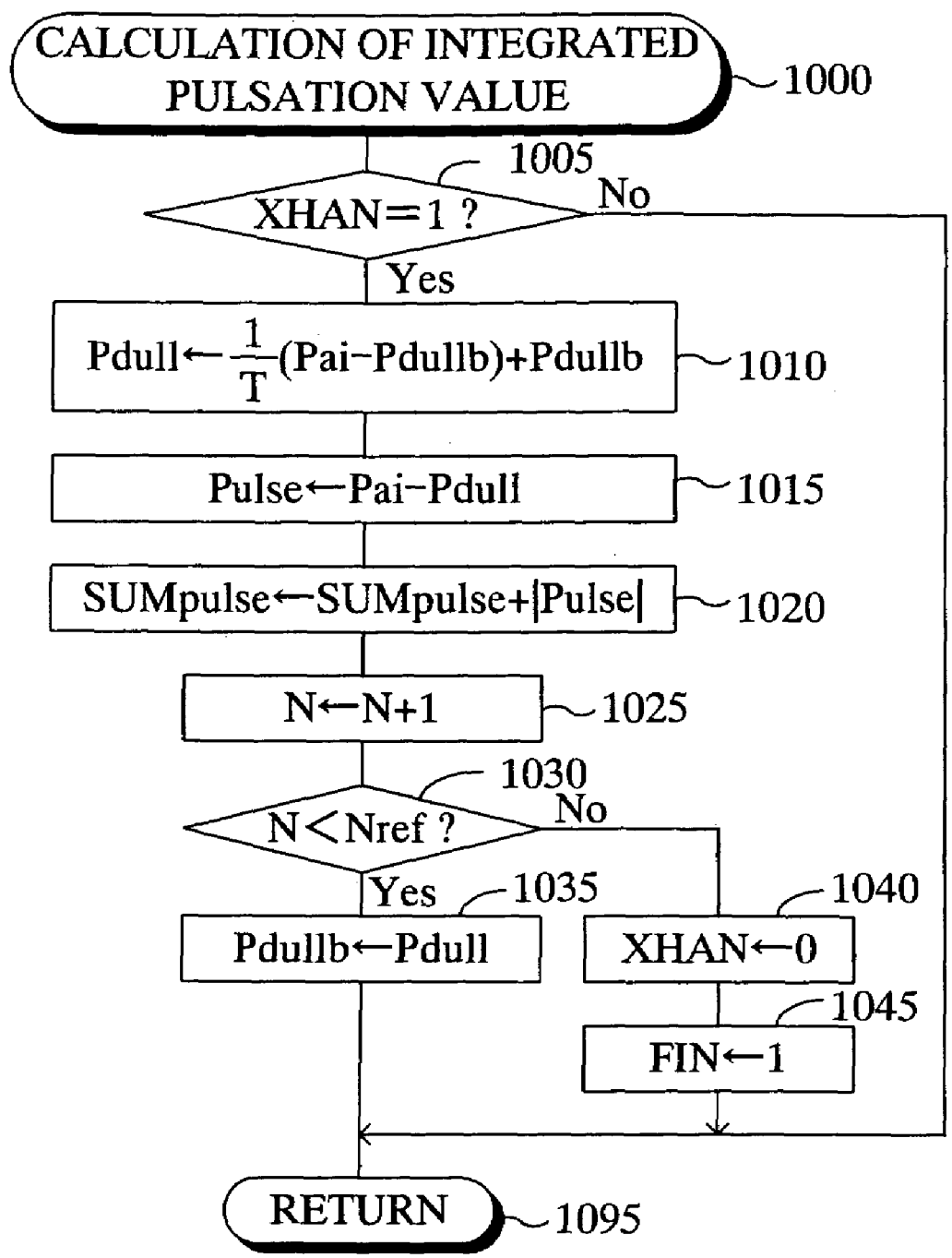
FIG. 10 is a flowchart showing a routine that the CPU shown in FIG. 1 executes for calculating the integrated pulsation value.

Even after that point of time, since the value of the anomaly-judgment-process-in-execution flag XHAN is maintained at "1," the calculation of the integrated pulsation value SUMpulse and the judgment on sufficiency of the ASV drive pressure are executed through repeated execution of the routines of FIGS. 10 and 11. In the state in which the ASV drive pressure Pdv is higher than the threshold value Pdvref has continued for the predetermined period of time T2, when, in the course of repeated execution of the routine of FIG. 10, the CPU 81 makes a "No" judgment in step 1030, the CPU 81 executes the process of step 1040 to thereby set the anomaly-judgment-process-in-execution flag XHAN to "0" (see time t5 in FIG. 7). After that point of time, when the CPU 81 proceeds to step 1105, the CPU 81 makes a "No" judgment, and immediately proceed to step 1195.

Next, anomaly judgment will be described. The CPU 81 repeatedly executes the routine shown in FIG. 12 every time a predetermined time elapses. Therefore, when predetermined timing is reached, the CPU 81 starts processing from step 1200 and proceeds to step 1205. In step 1205, the CPU 81 judges whether or not the anomaly judgment process end flag FIN is changed from "0" to "1." When the CPU 81 makes a "No" judgment, the CPU 81 immediately proceeds to step 1295 and ends the present routine for the present.

It is supposed that the step 1045 has just been executed. In this case, since the anomaly judgment process end flag FIN has just changed from "0" to "1," the CPU 81 makes a "Yes" judgment in step 1205 and proceeds to step 1210. In step 1210, the CPU 81 starts a process for judging whether or not the secondary air supply system 60 is anomalous.

In step 1210, the CPU 81 judges whether or not the AI-in-execution flag AIexe is "1." At the moment, since the AI ending condition in the previous step 820 is not established yet, and thus AI is in execution, the value of the AI-in-execution flag AIexe is maintained at "1." Therefore, the CPU 81 makes a "Yes" judgment in step 1210 and proceeds to step 1215. In step 1215, the CPU 81 sets the judgment during-AI-in-execution completion flag FINexe to "1." In the subsequent step 1220, the CPU 81 judges whether or not both of the following conditions (a) and (b) are established: (a) the integrated pulsation value SUMpulse, which has been updated by the process of the previous step 1020, is equal to or greater than the reference integrated-pulsation-value SUMpulseref; and (b) the current ASV upstream pressure Pai is equal to or higher than the reference pressure Pref (i.e., the CPU 81 judges whether or not the Pai and SUMpulse values fall within region 1 shown in FIG. 4).

When the CPU 81 makes a "Yes" judgment in step 1220 (i.e., when the Pai and SUMpulse values fall within region 1 shown in FIG. 4), the CPU 81 immediately proceeds to step 1295 and ends the present routine for the present. This case corresponds to the case where the secondary air supply system 60 is judged normal. By contrast, when, in step 1220, the CPU 81 makes a "No" judgment (i.e., the Pai and SUMpulse values fall outside region 1 shown in FIG. 4, so that the secondary air supply system 60 is judged anomalous), the CPU 81 proceeds to step 1225. In step 1225, the CPU 81 issues an instruction to light the alarm lamp 92 and stores in the backup RAM 84 the details of anomaly in the secondary air supply system 60. Then, the CPU 81 proceeds to step 1295 and ends the present routine for the present.

After this, since the value of the anomaly judgment process end flag FIN is maintained at "1," the CPU 81 makes a "No" judgment in step 1205 and immediately proceeds to step 1295. In step 1295, the CPU 81 ends the present routine for the present. In the above-described manner, while AI, which is started at the time of cold start, is continued (while the CPU 81 continuously instructs to execute AI), whether or not the secondary air supply system 60 during AI in execution is anomalous is judged once, and the judgment during-AI-in-execution completion flag FINexe is set to "1" in order to indicate that the judgment during AI in execution is completed.

Next will be described the case where, in the above state (a state in which AI, which is started at the time of cold start, is continued), the integrated intake air flow rate SUMGa reaches the reference integrated-intake-air-flow-rate SUMGaref (i.e., the predetermined duration elapses, and thus warming up the catalytic converter 53 is completed). In this case, as described previously, the value of the AI-in-execution flag AIexe is "1," and also the AI ending condition of the previous step 820 is established. Therefore, in step 820 of FIG. 8, the CPU 81 makes a "Yes" judgment and proceeds to step 840. In step 840, the CPU 81 instructs the secondary air supply system 60 to stop AI (specifically, the CPU 81 instructs the air pump 62 to stop and the solenoid valve 66 to close). Then, the CPU 81 proceeds to step 845 and changes the value of the AI-in-execution flag AIexe from current "1" to "0." Subsequently, the CPU 81 proceeds to steps 825 and 895 and ends the present routine for the present. Thus, AI is stopped.

After this, the AI starting condition is not established, because the AI-in-execution flag AIexe has been set to "0," and the integrated intake air flow rate SUMGa has reached the reference integrated-intake-air-flow-rate SUMGaref. Thus, the CPU 81 repeatedly executes the processes of steps 800, 805, and 815–825 until the internal combustion engine 10 stops (specifically, until the ignition switch IG is changed over from ON to OFF). Therefore, AI never resumes.

Figure 9:
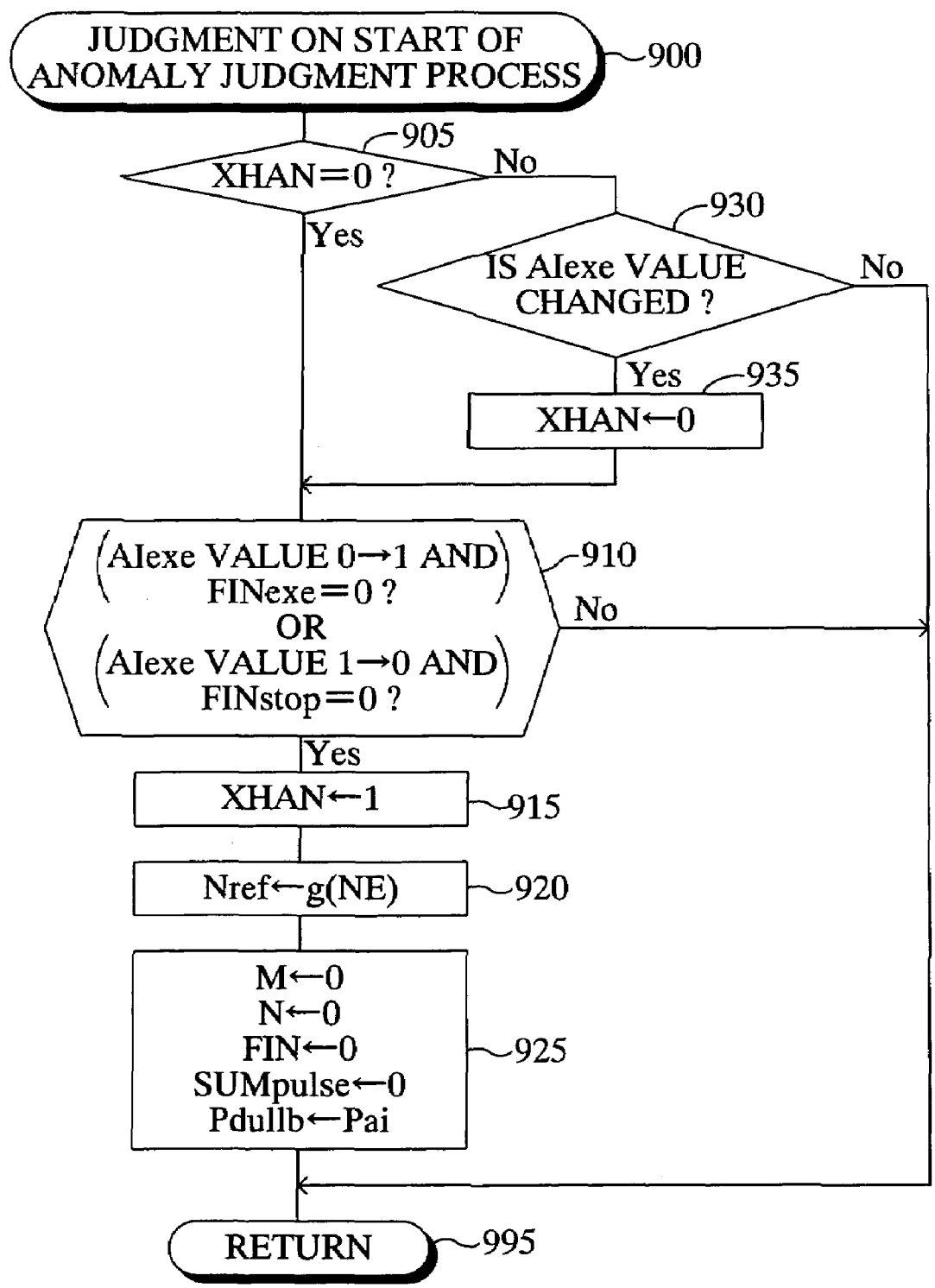
FIG. 9 is a flowchart showing a routine that the CPU shown in FIG. 1 executes for making judgment on start of an anomaly judgment process.

As described previously, at the moment, the CPU 81 is repeatedly monitoring, in step 910 of FIG. 9, whether or not the AI-in-execution flag AIexe is changed from "1" to "0." Here, it is assumed that the previous step 845 has been executed before proceeding to step 910. In this case, since the value of the judgment during-AI-in-halt completion flag FINstop is currently maintained at "0," the CPU 81 makes a "Yes" judgment in step 910 and again executes the processes of step 915 and subsequent steps. Therefore, since the anomaly-judgment-process-in-execution flag XHAN is again set to "1," the CPU 81 makes a "Yes" judgment in both of step 1005 of FIG. 10 and step 1105 of FIG. 11 and resumes integration (update) from "0" for obtaining the integrated pulsation value SUMpulse and the judgment on sufficiency of the ASV drive pressure.

Figure 12:
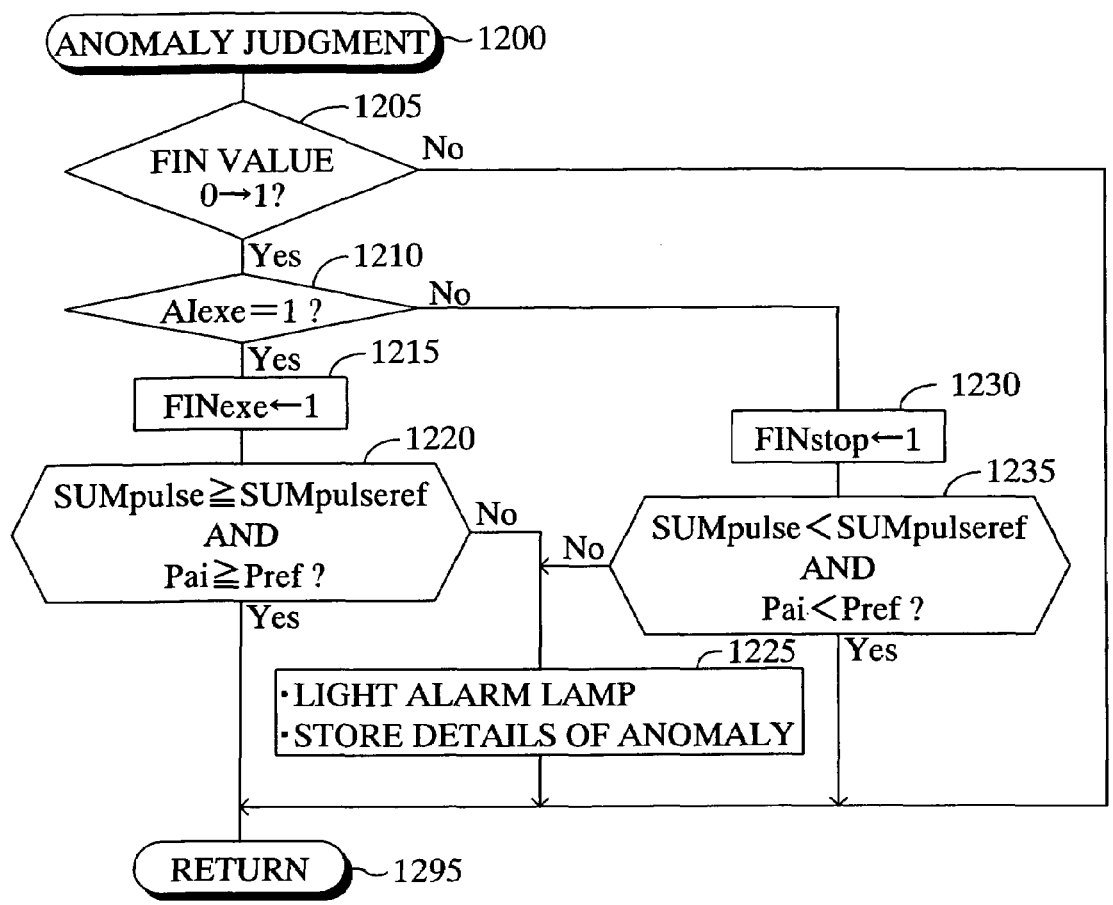
FIG. 12 is a flowchart showing a routine that the CPU shown in FIG. 1 executes for judging whether or not the secondary air supply system is anomalous.

When, in the course of repeated execution of the routine of FIG. 10, the CPU 81 makes a "No" judgment in step 1030 and thus executes the process of step 1045 to thereby again change the value of the anomaly judgment process end flag FIN from "0" to "1," the CPU 81 again makes a "Yes" judgment in step 1205 of FIG. 12 and proceeds to step 1210. Since the value of the AI-in-execution flag AIexe is currently "0," the CPU 81 makes a "No" judgment in step 1210 and proceeds to step 1230. In step 1230, the CPU 81 sets the judgment during-AI-in-halt completion flag FINstop to "1." In the subsequent step 1235, the CPU 81 judges whether or not both of the following conditions (a) and (b) are established: (a) the integrated pulsation value SUMpulse, which has been updated by the process of the previous step 1020, is less than the reference integrated-pulsation-value SUMpulseref; and (b) the current ASV upstream pressure Pai is less than the reference pressure Pref (i.e., the CPU 81 judges whether or not the Pai and SUMpulse values fall within region 2 shown in FIG. 4).

When the CPU 81 makes a "Yes" judgment in step 1235 (i.e., when the Pai and SUMpulse values fall within region 2 shown in FIG. 4), the CPU 81 immediately proceeds to step 1295 and ends the present routine for the present. This case corresponds to the case where the secondary air supply system 60 is judged normal. By contrast, when, in step 1235, the CPU 81 makes a "No" judgment (i.e., the Pai and SUMpulse values fall outside region 2 shown in FIG. 4, so that the secondary air supply system 60 is judged anomalous), the CPU 81 proceeds to step 1225. In step 1225, the CPU 81 issues an instruction to light the alarm lamp 92 and stores in the backup RAM 84 the details of anomaly in the secondary air supply system 60. Then, the CPU 81 proceeds to step 1295 and ends the present routine for the present.

After this, since the value of the anomaly judgment process end flag FIN is maintained at "1," the CPU 81 makes a "No" judgment in step 1205 and immediately proceeds to step 1295. In step 1295, the CPU 81 ends the present routine for the present. In the above-described manner, while AI after cold start is ended and held in halt (while the CPU 81 continuously instructs to stop AI), whether or not the secondary air supply system 60 during AI in halt is anomalous is judged once, and the judgment during-AI-in-halt completion flag FINstop is set to "1" in order to indicate that the judgment during AI in halt is completed. As a result, since the judgment during-AI-in-execution completion flag FINexe and the judgment during-AI-in-halt completion flag FINstop are both set to "1," the CPU 81 cannot make a "Yes" judgment in step 910 of FIG. 9. Therefore, since then, the CPU 81 does not proceed to step 915, in which the anomaly-judgment-process-in-execution flag XHAN is set to "1," and thus integration for obtaining the integrated pulsation value SUMpulse and judgment on the aforementioned abrupt change in pressure never resume. In the above-described manner, the anomaly judgment process for judging whether or not the secondary air supply system 60 is anomalous is started once when secondary air supply control is started or ended. Also, every time the anomaly judgment process ends, whether or not the secondary air supply system 60 is anomalous is judged.

In the case where the anomaly judgment process is in execution (i.e., the value of the anomaly-judgment-process-in-execution flag XHAN is "1"), when the value of the AI-in-execution flag AIexe changes (specifically, when the AI ending condition in step 820 of FIG. 8 is established during AI in execution or when the AI starting condition in step 815 of FIG. 8 is established during AI in halt), the CPU 81 makes a "No" judgment in step 905 of FIG. 9; proceeds to step 930 and makes a "Yes" judgment; proceeds to step 935 and sets the anomaly-judgment-process-in-execution flag XHAN to "0;" and performs the judging process of step 910. In this case, the currently performed calculation of the integrated pulsation value SUMpulse and judgment on sufficiency of the ASV drive pressure are stopped; and only when the condition of step 910 is established, the calculation of the integrated pulsation value SUMpulse and the judgment on sufficiency of the ASV drive pressure are resumed.

As described above, according to the present embodiment, the anomaly judgment process (process of performing integration (update) over the predetermined period of time T1 for obtaining the integrated pulsation value SUMpulse) is substantially started, provided that the state in which the ASV drive pressure Pdv (=the atmospheric pressure Pa0–the throttle valve downstream pressure Pm) is higher than the threshold value Pdvref has continued for the predetermined period of time T2. Further, when the predetermined period of time T1 has elapsed, the judgment as to whether the secondary supply system 60 is anomaly is performed on the bases of the integrated pulsation value SUMpulse at that point of time. Accordingly, during execution of the secondary air supply control, it is guaranteed that the integrated pulsation value SUMpulse is calculated in a state in which a sufficient ASV drive pressure Pdv (i.e., sufficient negative pressure) required to reliably open the ASV 63 is applied to the ASV 63. As a result, it becomes possible to prevent an erroneous judgment, which would otherwise be made, when the ASV 63 does not open reliably due to insufficient negative pressure.

The present invention is not limited to the above-described embodiment, but may be embodied in various other forms without departing from the scope of the invention. For example, in the above embodiment, a so-called normally-closed negative-pressure-responsive-type open-close valve which is opened (changed from a close state to an open state) by drive force produced by negative pressure is used as the ASV 63. However, a so-called normally-opened negative-pressure-responsive-type open-close valve which is closed (changed from an open state to a closed state) by drive force produced by negative pressure may be used as the ASV 63. In this case, the solenoid valve 66 must be controlled in such a manner that its open and closed states are reversed of those in the above-described embodiment. In this case, when the secondary air supply control is in halt, it is guaranteed that the integrated pulsation value SUMpulse is calculated in a state in which a sufficient ASV drive pressure Pdv (i.e., sufficient negative pressure) required to reliably close the ASV 63 is applied to the ASV 63. As a result, it becomes possible to prevent an erroneous judgment, which would otherwise be made, when the ASV 63 does not close reliably due to insufficient negative pressure.

In the above embodiment, the above-mentioned anomaly judgement means judges whether the secondary air supply system 60 is anomalous on the basis of the ASV upstream pressure Pai detected by the pressure sensor 79 and the pulsation level (integrated pulsation value SUMpulse) thereof. However, the judgment may be performed on the basis of current supplied to an unillustrated electric motor for driving the air pump 62, because the current supplied to the electric motor is generally in proportion to the load that the air pump 62 imposes on the electric motor (accordingly, the ASV upstream pressure Pai, which is the discharge pressure of the air pump 62).

Further, the above judgment may be performed on the basis of an output from the air-fuel ratio sensor 76, which is disposed in a portion of the exhaust path located between the location where secondary air is supplied and the catalytic converter 53. In this case, an attention is paid to the fact that when the secondary air supply system 60 is normal, performance of secondary air supply control causes the air-fuel ratio of exhaust gas as measured on the upstream side of the air-fuel ratio sensor 76 to slightly shift to the lean side. Thus, when the output of the air-fuel ratio sensor 76 during execution of the secondary air supply control does not indicate a slightly-lean-side air-fuel ratio (e.g., indicates a rich-side air-fuel ratio), the secondary air supply system can be judged to be anomalous.

In the above-described embodiment, the throttle-valve-downstream-pressure acquisition means is configured to include a table for estimating the throttle valve downstream pressure Pm on the basis of the throttle valve opening TA and the engine speed NE. However, the throttle-valve-downstream-pressure acquisition means may be a pressure sensor disposed in a portion of the intake path downstream of the throttle valve 43 and adapted to physically measure the throttle valve downstream pressure Pm.

The above embodiment is configured such that the dulling time constant T in Expression 2 is a constant value. However, the configuration may be such that the dulling time constant T in Expression 2 varies in accordance with an operating condition (e.g., the engine speed NE) of the internal combustion engine 10.

The above embodiment is configured such that the integrated pulsation value SUMpulse is calculated by integrating, over the predetermined period of time T1, the absolute value of the deviation Pulse between the current ASV upstream pressure Pai and the current dulled pressure Pdull. However, the configuration may be such that the ASV upstream pressure Pai is stored every arithmetic cycle over the predetermined period of time T1; the values of the ASV upstream pressure Pai stored over the predetermined period of time T1 are averaged to obtain the average value Paiave; and the integrated pulsation value SUMpulse is calculated by integrating, over the predetermined period of time T1, the absolute value of the deviation between the ASV upstream pressure Pai and the average value Paiave.

The above embodiment is configured such that the predetermined period of time T1 (specifically, the reference-value for judgment on end-of-anomaly-judgment-process Nref) is determined in accordance with the engine speed NE as measured at the starting point of the predetermined period of time T1. However, the predetermined period of time T1 (specifically, the reference-value for judgment on end-of-anomaly-judgment-process Nref) may be constant.

The above embodiment is configured such that the pressure sensor 79 is disposed in a portion of the secondary air supply path 61 located downstream of the air pump 62 and upstream of the ASV 63. However, the configuration may be such that the pressure sensor 79 is disposed in a portion of the secondary air supply path 61 located downstream of the ASV 63 (and upstream of the reed valve 64). In this case, whether or not the secondary air supply system 60 is anomalous is judged on the basis of the pressure of air (secondary air) in a portion of the secondary air supply path 61 located downstream of the ASV 63 and the pulsation level (integrated pulsation value) of the pressure.

The above embodiment is configured such that judgment as to whether or not the secondary air supply system 60 is anomalous is performed once in each of a period in which AI is executed and a period in which AI is stopped. However, the configuration may be such that judgment as to whether or not the secondary air supply system 60 is anomalous is performed a plurality of times in each of the period in which AI is executed and the period in which AI is stopped.

What is claimed is:

1. An anomaly judgment apparatus for a secondary air supply system which includes a secondary air supply path for introducing secondary air into a portion of an exhaust path of an internal combustion engine located upstream of a catalytic converter disposed in the exhaust path, and an open-close valve which utilizes, as negative pressure, pressure in a portion of an intake path of the engine downstream of a throttle valve disposed in the intake path, the open-close valve being at least one of opened and closed by means of drive force produced by the negative pressure so as to open and close the secondary air supply path, the anomaly judgment apparatus comprising:

anomaly judgment means for judging whether or not the secondary air supply system is anomalous;

negative pressure judgment means for judging whether or not the negative pressure is secured to a degree required for the drive force to at least one of reliably open and close the open-close valve; and anomaly judgment prohibition means for prohibiting judgment by the anomaly judgment means when the negative pressure judgment means judges that the negative pressure is not secured to the required degree.

2. An anomaly judgment apparatus for a secondary air supply system according to claim 1, wherein the open-close valve is a normally-closed negative-pressure-responsive-type open-close valve which is opened by the drive force produced by the negative pressure, or a normally-opened negative-pressure-responsive-type open-close valve which is closed by the drive force produced by the negative pressure.

3. An anomaly judgment apparatus for a secondary air supply system according to claim 1, wherein the secondary air supply system to which the anomaly judgment apparatus is applied includes an air pump which is provided in a portion of the secondary air supply path upstream of the open-close valve, the air pump being adapted to introduce air into the secondary air supply path, and a pressure sensor for detecting pressure within a portion of the secondary air supply path between the air pump and the open-close valve.

4. An anomaly judgment apparatus for a secondary air supply system according to claim 3, wherein the anomaly judgment means judges whether or not the secondary air supply system is anomalous, on the basis of any one of pressure detected by the pressure sensor, the pressure and a pulsation level representing a degree of pulsation of the pressure, a value in relation to energy consumed by drive of the air pump and an air-fuel ratio of exhaust gas flowing between a location to which the secondary air is supplied and the catalytic converter.

5. An anomaly judgment apparatus for a secondary air supply system according to claim 1, wherein the negative pressure judgment means comprises acquisition means for acquiring a value corresponding to the drive force, and the negative pressure judgment means judges that the negative pressure is not secured to the required degree when a state in which the value corresponding to the drive force is greater than a predetermined value does not continue for a predetermined period of time.

6. An anomaly judgment apparatus for a secondary air supply system according to claim 5, wherein the acquisition means comprises an atmospheric pressure sensor for detecting an atmospheric pressure, and a throttle-valve-downstream-pressure acquisition means for acquiring pressure in a portion of the intake path downstream of the throttle valve, wherein the acquisition means acquires, as the value corresponding to the drive force, a differential pressure between the detected atmospheric pressure and the acquired pressure in the intake path.

7. An anomaly judgment apparatus for a secondary air supply system according to claim 3, wherein the value of the atmospheric pressure to be used for obtaining the differential pressure is updated on the basis of the output value of the atmospheric pressure sensor every time the engine is started.

* * * * *